(12) United States Patent
Yonekawa

(10) Patent No.: US 6,949,759 B2
(45) Date of Patent: Sep. 27, 2005

(54) RADIOGRAPHIC IMAGE READING APPARATUS

(75) Inventor: Hisashi Yonekawa, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 93 days.

(21) Appl. No.: 10/638,780

(22) Filed: Aug. 11, 2003

(65) Prior Publication Data

US 2004/0089826 A1 May 13, 2004

(30) Foreign Application Priority Data

Aug. 16, 2002 (JP) .......................................... 2002-237700

(51) Int. Cl.[7] .............................................. G03B 42/08
(52) U.S. Cl. ................................................... 250/584
(58) Field of Search ............................ 250/327.2, 584, 250/588, 589, 581

(56) References Cited

U.S. PATENT DOCUMENTS 5,025,156 A * 6/1991 Ohgoda ..................... 250/590
6,781,144 B2 * 8/2004 Yonekawa .................. 250/589
2001/0032945 A1   10/2001 Yasuda

FOREIGN PATENT DOCUMENTS

| EP | 0 919 857 A2 | 6/1999 |
|----|--------------|--------|
| EP | 1 209 517 A2 | 5/2002 |

OTHER PUBLICATIONS

European Search Report for 03017985.7–2213 dated Nov. 25, 2003.

* cited by examiner

*Primary Examiner*—David Porta
*Assistant Examiner*—Marcus Taningco
(74) *Attorney, Agent, or Firm*—Cantor Colburn LLP

(57) ABSTRACT

A radiographic image reading apparatus for reading image information stored in a storage phosphor sheet from a cassette in which the storage phosphor sheet is incorporated and on which code information is recorded at a predetermined position.

11 Claims, 12 Drawing Sheets

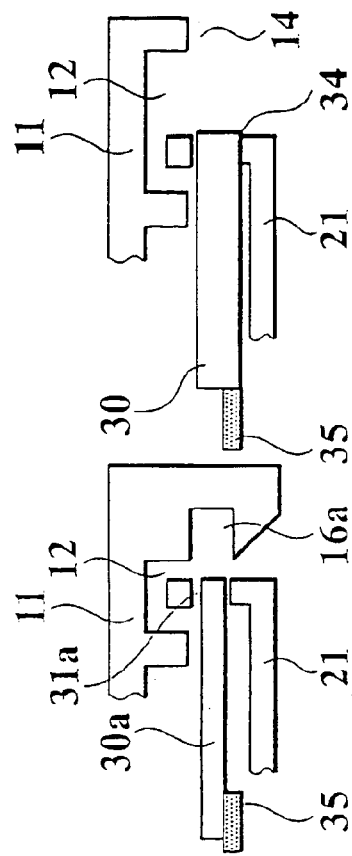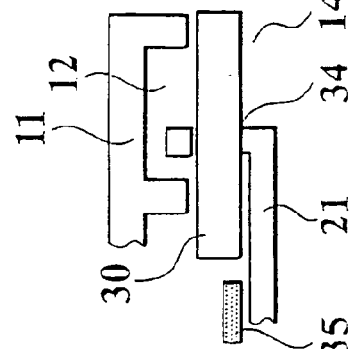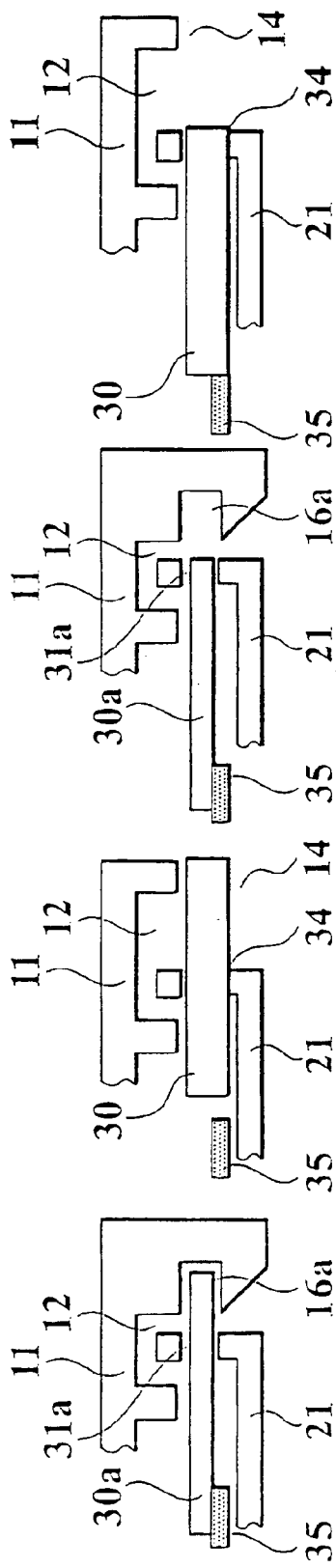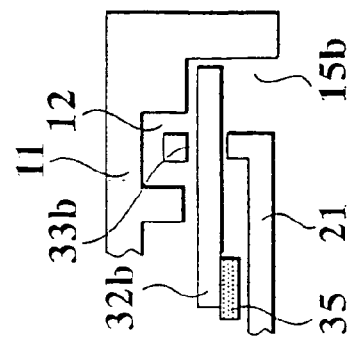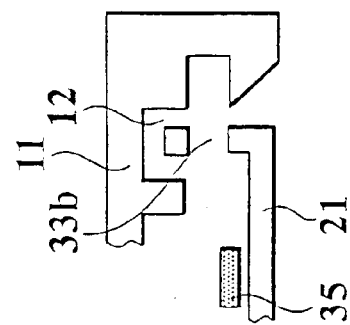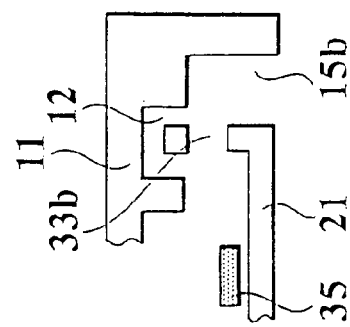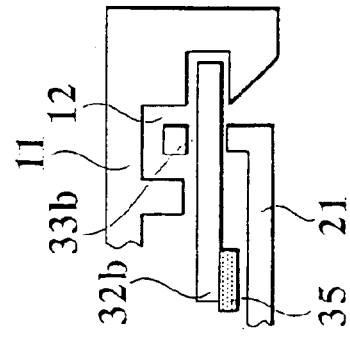

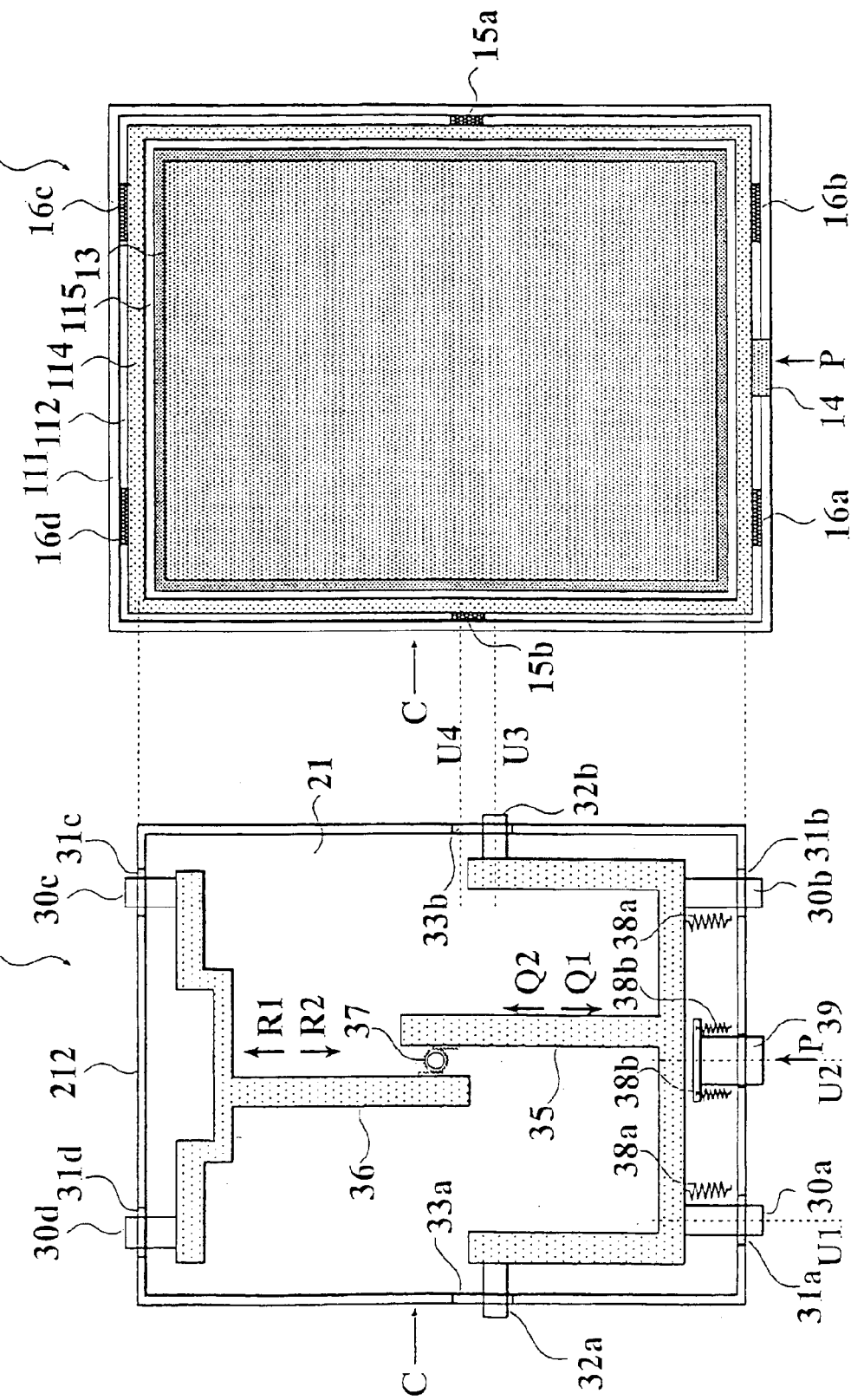

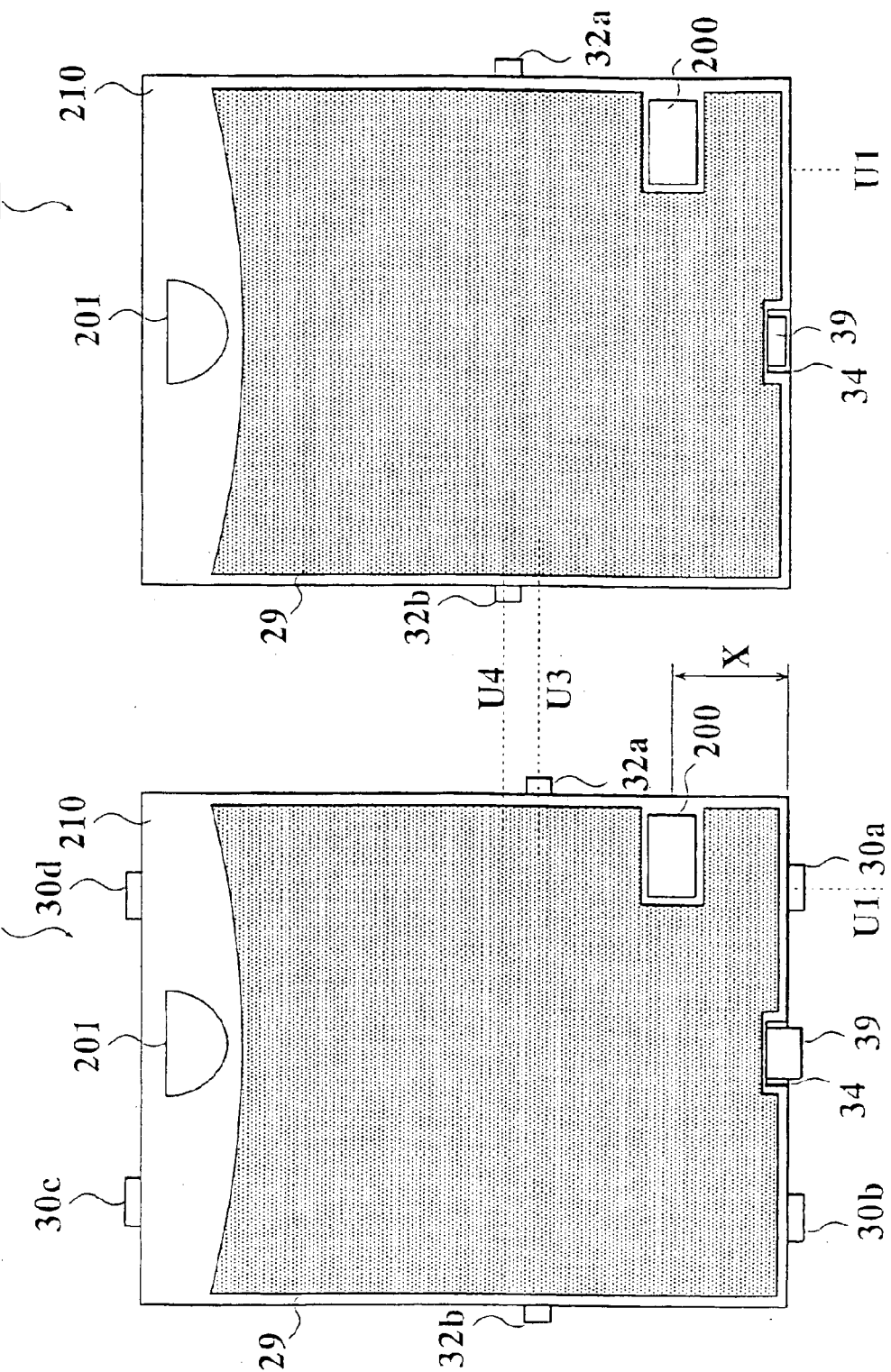

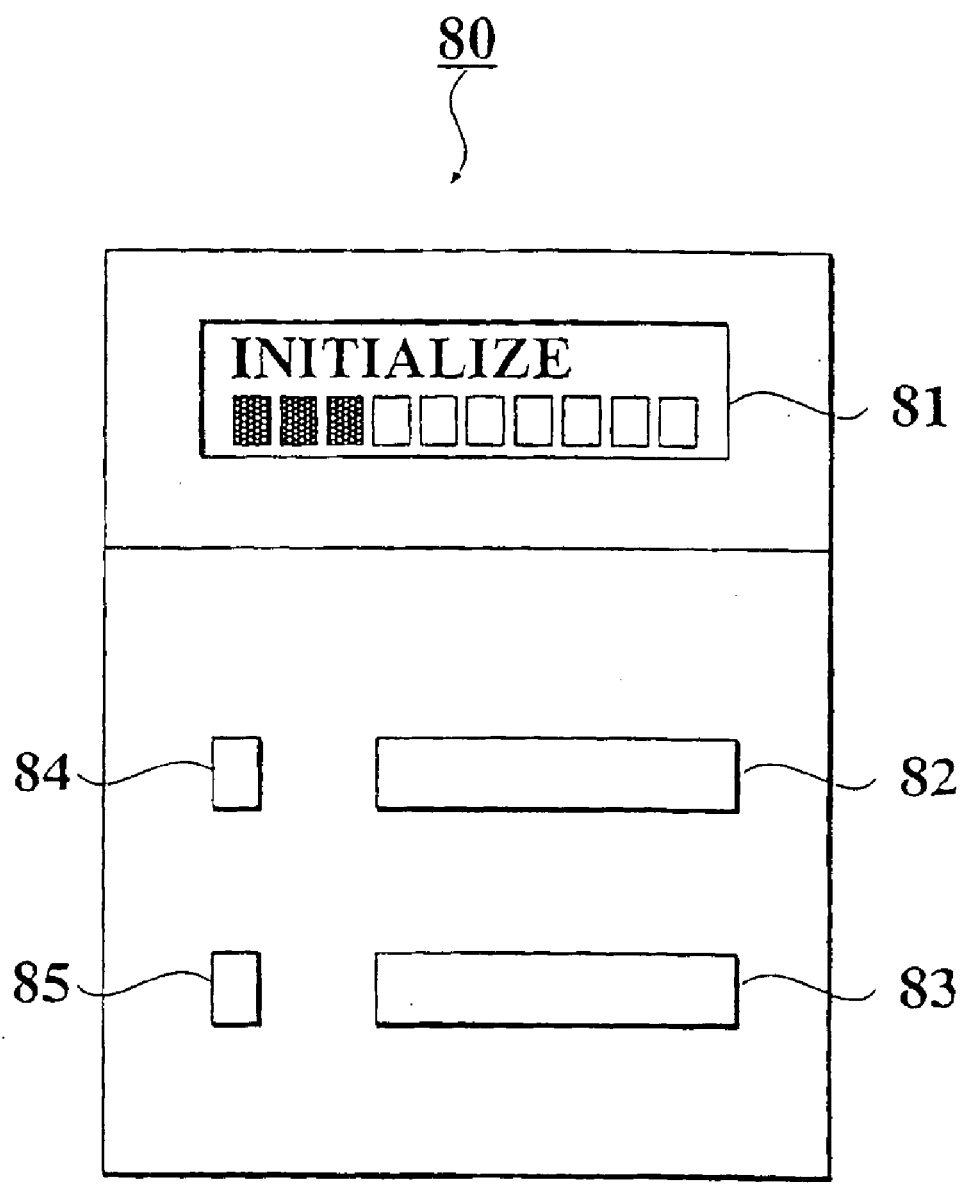

RADIOGRAPHIC IMAGE READING APPARATUS

BACKGROUND OF THE INVENTION

1. Field of the Invention

The present invention relates to a radiographic image reading apparatus for reading radiographic image information stored in a storage phosphor sheet.

2. Description of Related Art

A radiographic image reading apparatus outputting image information as digital data has been frequently used for digitizing radiographic image information generated at hospitals to store and to telephotograph the digitized radiographic image information. As a radiographic image reading apparatus for outputting such digital data, a radiographic image reading apparatus using a storage phosphor sheet is well known.

In a radiographic image reading apparatus for reading the radiographic image information from the storage phosphor sheet as described above, a mechanism for taking out the storage phosphor sheet from the cassette and for conveying only the storage phosphor sheet in the apparatus, is ordinarily used. In such a conveyance mechanism, a one side reference conveying system in which the storage phosphor sheet is conveyed by shifting it to one side along the conveying direction thereof, is generally used. However, in a system in which the cassette is conveyed in the apparatus like the present invention, a conveying method in which the weight of the cassette is considered, is required. Further, because the weight difference between a small cassette having 18×24 cm size and a large cassette having 14"×17" size is large, a technique that the both cassettes are stably conveyed and the image information is accurately read is required. On the other hand, in an operation in which the cassette is inserted into the apparatus, it is required that the information attached to the cassettes having various sizes is inexpensively and securely read. Further, a simple inserting method is required. As described above, in a system in which the cassette is conveyed in the apparatus, there are various problems to be solved as compared with a case in which only the storage phosphor sheet is conveyed in an apparatus.

SUMMARY OF THE INVENTION

The present invention was made in consideration of such a situation. It is an object of the present invention to provide a radiographic image reading apparatus which can stably read cassette code information without a sensor which can read the information in a wide area, and which can steadily read image information stored in a phosphor sheet.

In accordance with a first aspect of the invention, a radiographic image reading apparatus for reading image information stored in a storage phosphor sheet from a cassette in which the storage phosphor sheet is incorporated and on which code information is recorded at a predetermined position, comprises:

an insertion opening into which the cassette is inserted along to an end side of a width direction of the insertion opening;

a code information read mechanism for reading the code information of the inserted cassette positioned along the end side of the width direction of the insertion opening;

a width shifting mechanism for shifting the cassette in which the code information is read by the code information read mechanism, to a center of a width direction of a conveyance mechanism for conveying the cassette;

a separation mechanism for separating a front panel of the cassette from a back panel of the cassette in which the storage phosphor sheet is incorporated, after the cassette is shifted by the width shifting mechanism in order to read the image information stored in the storage phosphor sheet; and an image information read mechanism for reading the image information stored in the storage phosphor sheet of the back panel separated by the separation mechanism so as to read the image information.

Because the code information of the cassette inserted into the insertion opening along to one end side of the width direction of the insertion opening is read, the code information which is positioned within a predetermined range can be read, and thereby the code information of the cassette can be stably read even if no expensive read sensor which can read the information in a wide area is provided. Furthermore, because a cassette in which the code information is read is shifted to the center of a width direction of the conveyance mechanism and the front panel of the shifted cassette is separated from the back panel, the front panel can be stably separated from the back panel by a simple mechanism.

The code information of the cassette may include information for specifying a size of the cassette, and the width shifting mechanism may shift the cassette on the basis of the code information.

The code information including the information for specifying the size of the cassette is stably read, and the cassette is shifted by using the code information. Consequently, the cassette can be shifted easily and correctly.

The image information read mechanism may read the image information while the storage phosphor sheet is sub-scanned on a center reference.

The sub-scanning which requires precise conveyance, can be easily balanced. When the image is read, the nonuniformity of speeds can be suppressed to increase reliability and stability. Moreover, the collecting balance of a collecting system for reading the image can be also adjusted by a center reference, and the image quality of the central part of a screen, at which the image quality is required, can be aligned against any size of a cassette.

The radiographic image reading apparatus may further comprise:

a carrying mechanism for carrying the cassette in which the code information is read by the code information read mechanism, from the insertion opening to an inside of the apparatus; and an insertion shutter for closing the insertion opening after the cassette is carried in the inside of the apparatus from the insertion opening by the carrying mechanism;

wherein the width shifting mechanism shifts the cassette after the insertion opening is closed by the insertion shutter.

Because the cassette is shifted after the insertion opening is closed, an operator does not have bad feeling caused by the movement of a cassette in the state in which a hand of the operator is touched to the cassette.

The radiographic image reading apparatus may further comprise:

an erase mechanism for easing image information remaining in the storage phosphor sheet after the image information of the storage phosphor sheet is read by the image information read mechanism;

a uniting mechanism for uniting the back panel with the front panel after the image information remained in the storage phosphor sheet on the back panel is erased by the erase mechanism; and an ejection mechanism for conveying the cassette with the storage phosphor sheet is united by the uniting mechanism, on a center reference to eject the cassette.

Because the cassette is ejected by the center reference, the ejection control of the cassette can be easily executed.

The image information may be read from a plurality of cassettes having different sizes from each other.

The radiographic image reading apparatus may further comprise:

at least two modes of a read mode for reading the image information stored in the storage phosphor sheet with the image information read mechanism, and an erase mode for erasing the image information stored in the storage phosphor sheet with the erase mechanism; and a switching mechanism for switching the two modes.

Because the radiographic image reading apparatus is configured to include at least two modes of the read mode and the erase mode, and to includes the switching mechanism for switching the at least two modes in a radiographic image reading apparatus body, a user can select a necessary mode for a short time. Then, the work efficiency is improved.

The read mode may perform at least two operations of a read operation for reading the image information from the storage phosphor sheet with the image information read mechanism, and an erase operation for erasing image information remaining in the storage phosphor sheet after the read operation is carried by the erase mechanism.

Because the read mode is configured to perform at least two operations of the read operation and the erase operation, there in no necessity to perform the erase mode after the read mode. Then, the work efficiency of a user is improved.

The erase mode may perform the erase operation without performing the read operation for reading the image information with the image information read mechanism.

Because the erase mode is configured to perform the erase operation without performing the read operation, the radiographic image which has been erroneously photographed can be erased without being read. Then, the work efficiency of a user is improved.

The read mode may be automatically selected at starting of the radiographic image reading apparatus, and the erase mode and the read mode are alternately selected by operating the switching mechanism.

Because the read mode which is used most frequently at the starting, is automatically selected, a user can ordinarily use the apparatus without being conscious of the erase mode. Moreover, because the switching mechanism for being able to switch the erase mode and the read mode alternately is provided, the two modes can be selected with a simple operation. Then, the work efficiency of the user is improved.

In a case that the erase mode is selected, when the cassette is supplied to the radiographic image reading apparatus within a predetermined time, the erase operation may be executed; and when the cassette is not supplied to the radiographic image reading apparatus within the predetermined time, the erase mode may be automatically finished and the radiographic image reading apparatus may return to the read mode.

The radiographic image reading apparatus is configured so that, in case of the selection of the erase mode, when a cassette is supplied to the apparatus within a predetermined time, the erase operation is executed, and that, when the cassette is not supplied to the apparatus within the predetermined time, the erase mode is automatically finished and the apparatus returns to the read mode. Consequently, the danger of the erroneous erase of the storage phosphor sheet in which a user wants to read the image, is eliminated.

In the erase mode, when the cassette is supplied to the radiographic image reading apparatus within a predetermined time after the erase operation is finished, the erase mode may be continuously carried out, and when the cassette is not supplied to the radiographic image reading apparatus within the predetermined time, the erase mode may be automatically finished and the radiographic image reading apparatus may return to the read mode.

The radiographic image reading apparatus is configured so that, in the erase mode, when a cassette is supplied to the apparatus within a predetermined time after the erase operation is finished, the erase operation is continuously executed, and that, when the cassette is not supplied to the apparatus within a predetermined time, the erase mode is automatically finished and the apparatus returns to the read mode. Consequently, the trouble of re-switching to the erase mode at every chance of erasing the image is saved in such a case where a user wants to erase a plurality of sheets continuously, and then the work efficiency of the user is improved. Moreover, because the apparatus automatically return to the read mode after the erase work is finished, the danger of the erroneous erase of the storage phosphor sheet in which the user wants to read the image, is eliminated.

The radiographic image reading apparatus may further comprise a display for displaying the predetermined time.

Because the display for displaying a predetermined time is provided, a waiting time for continuously easing the image can be confirmed. Consequently, a user can perform erase work without anxiety.

A residual time of the predetermined time displayed on the display is displayed by count down.

Because the predetermined residual time is displayed by count down, the necessity of caring about the residual time is eliminated, and a user can perform erase work without anxiety.

The erase mode may include a plurality of erase operations in which erase speeds are different from each other, and the plurality of erase operations may be selected by operating the switching mechanism.

Because the radiographic image reading apparatus is configure so that the erase mode includes a plurality of erase operations in which erase speeds are different from each other, and that the plurality of erase operations can be switched by the switching mechanism for switching the read mode and the erase mode, a user can select a desired erase speed with a few operations easily. Then, the work efficiency of the user is improved.

An operation of switching from the read mode to the erase mode may require a long pressing operation of a button or a switch of the switching mechanism.

Because the radiographic image reading apparatus is configure so that the operation for switching the read mode to the erase mode requires to perform a long pressing operation of a button or a switch, the accident of loosing image information by entering the erase mode erroneously during the reading of the image can be prevented.

BRIEF DESCRIPTION OF THE DRAWINGS

Embodiments will now be described, by way of example only, with reference to the accompanying drawing which are meant to be exemplary, not limiting, and wherein like elements are numbered alike in several Figures, in which:

FIGS. 3A, 3B, 3C, 3D, 3E, 3F, 3G and 3H are views showing the back panel and the front panel when they are in a locked state;

FIGS. 4A and 4B are views showing a lock mechanism of the back panel and the front panel;

FIGS. 5A and 5B are views showing the back panel of the cassette when the back panel is looked at from the back side thereof;

FIG. 9 is a view showing a display and operation section when it is looked at from the front;

DETAILED DESCRIPTION OF THE PREFERRED EMBODIMENTS

Hereinafter, the attached drawings are referred while the preferred embodiments of the present invention are described in detail. FIGS. 1A to 5B are views showing a cassette 1 to be used in a radiographic image reading apparatus of the present invention.

Figure 1B:
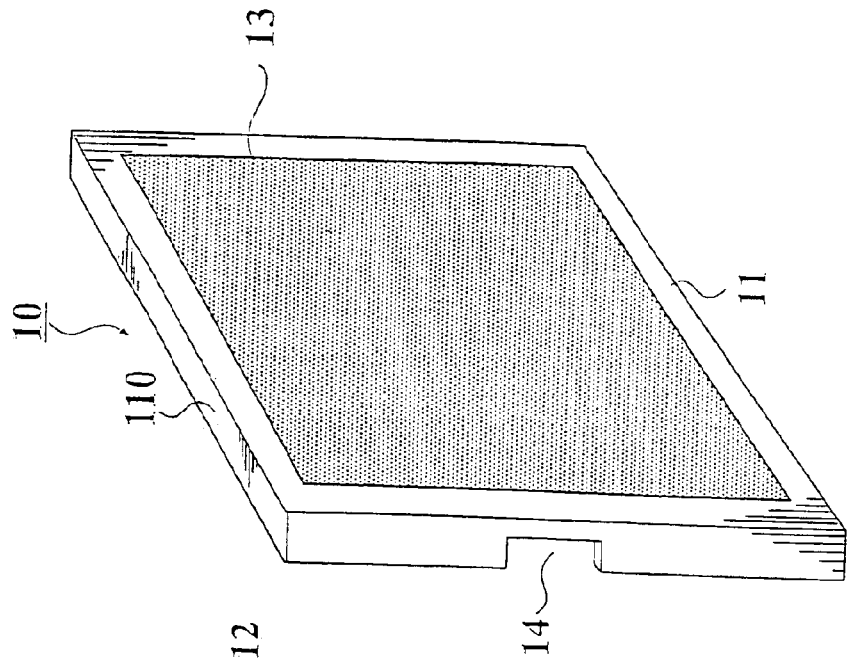
FIGS. 1A and 1B are perspective views showing a cassette when the front panel and the back panel are separated.
Figure 1A:
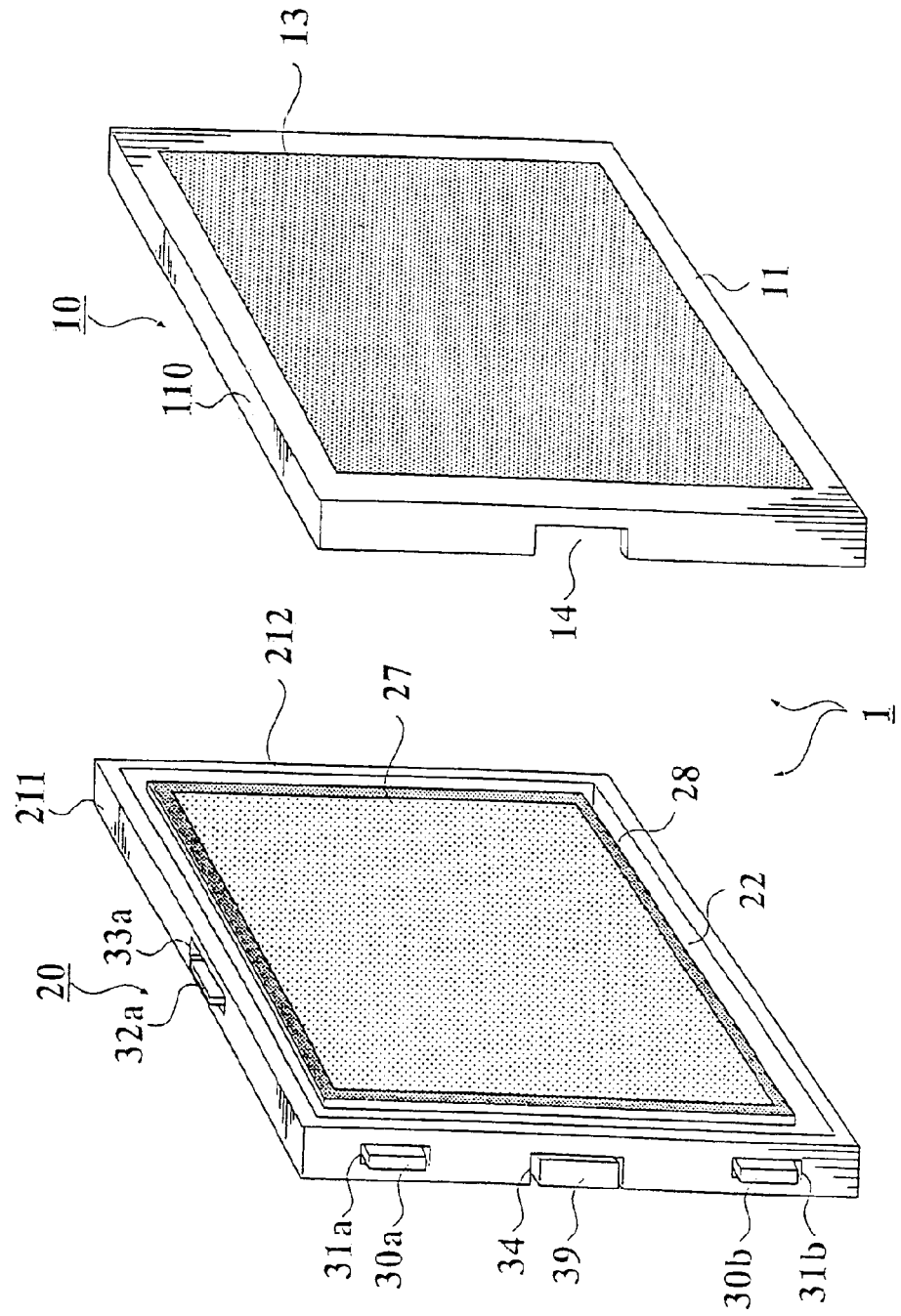
Figure 2:
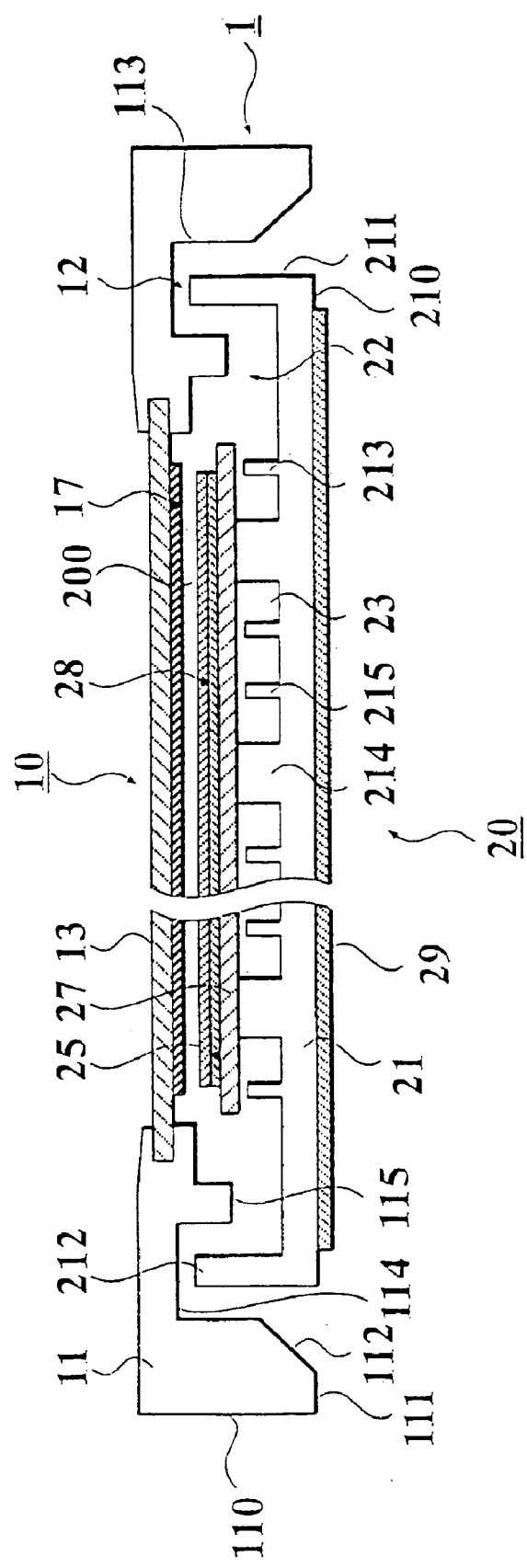
FIG. 2 is a sectional view showing the cassette when the front panel and the back panel are united.

The cassette 1 is composed of a front panel 10 and a back panel 20 which can be separated from each other. FIGS. 1A and 1B are perspective views showing the cassette 1 when the front panel 10 and the back panel 20 are separated. FIG. 2 is a sectional view showing the cassette 1 when the front panel 10 and the back panel 20 are united. FIGS. 3A, 3B, 3C, 3D, 3E, 3F, 3G and 3H are sectional views of the cassette 1 which show the states of the lock mechanism. FIGS. 4A and 4B are views showing the lock mechanism of the cassette 1. FIGS. 5A and 5B are views showing the back panel 20 when it is looked at from the back side thereof (opposite side of the front panel 10).

The front panel 10 is composed of a frame 11 and a front face plate 13. A non-woven fabric 17 is stuck on the inner face of the front face plate 13. The frame 11 is composed of a frame side face 110, a frame bottom face 111, an inclined face 112 and an inward face 113 forming a predetermined angle inclination, a frame inner surface 114, a shielding projection 115, an insertion opening 14, notches 15a and 15b, and locking recesses 16a, 16b, 16c and 16d. The inclined face 112 and the shielding projection 115 form a recess 12 in the inner part of the frame 11.

By the formation of the inclined face 112 on the frame 11 in such a way, the alignment accuracy when the back panel 20 is united with the front panel 10 can be designed roughly. That is, by the formation of the inclined face 112 on the frame 11, the inclined face 112 automatically guides the back panel 20 to the uniting position even when the position at which the back panel 20 is united with the front panel 10 is shifted a little. Consequently, the requirements for parts accuracy and assembly accuracy on an apparatus side can be relaxed. Moreover, when fine deformations are produced in the framework and the mechanism of an apparatus at the transportation of the apparatus, the probability of causing a defect can be reduced very much by the uniting work of the front panel 10 and the back panel 20.

It is preferable that the frame 11 is made of a material bearable with large weight at full weighting photographing such as aluminum, rigid plastic or the like. It is preferable that the front face plate 13 is made of a member which has large strength and a relatively small radiation absorption rate such as aluminum, carbon fiber reinforced plastic or the like.

Because a cassette of the type of opening and closing the side face side of the cassette or the type of drawing out a side face plate of the cassette cannot be configured to have the structure having no rift of the outer periphery of the side face of the cassette, the structure is weak at a load from the front side. On the contrary, because the present embodiment has the structure in which the frame 11 of the front panel 10 covers the outer periphery of the front face plate 13 without any rift, the embodiment can receive the load imposed from the front panel 10 side of the cassette 1 during photographing on the whole frame 11 equally. Consequently, the structure of the embodiment has the strong durability to the load imposed from the front panel 10 side.

The back panel 20 is formed by means of a back panel body 21, a radiation absorbing sheet 25, a support plate 27 and a storage phosphor sheet 28.

The storage phosphor sheet 28 is bonded to the support plate 27 with the radiation absorbing sheet 25 between them. The radiation absorbing sheet 25 is, for example, a lead sheet, and absorbs a radiation transmitted through the storage phosphor sheet 28. Thereby, it is prevented that a back-scatter transmitted from the compositions, such as the support plate 27 and the back panel body 21, of the cassette 1, which are positioned behind the storage phosphor sheet 28, and a back-scatter transmitted from the other compositions which would exist behind the cassette 1 reach the storage phosphor sheet 28. The support plate 27 is bonded on the surface of bonded parts 214 with a double-faced adhesive tape or a bonding agent at the strength capable of being reference-bonded. The bonded parts 214 and ribs 215 form air phases 23 to contribute to the weight saving of the cassette. As described above, the storage phosphor sheet 28 having the support plate 27 form an integral structure with the back panel body 21 in the form capable of being peeled from each other.

When the storage phosphor sheet 28 is wanted to be exchanged, the storage phosphor sheet 28 is peeled off from the bonded parts 214 together with the support plate 27. After that, a support plate 27 to which a new storage phosphor sheet 28 is attached may be bonded to the bonded parts 214 with double-faced adhesive tapes, a bonding agent or the like. When the double-faced adhesive tapes are used for the boding of the support plate 27 to the bonded parts 214, it is preferable that the double-faced adhesive tapes are previously bonded on the bonding parts of the support substance 27 with the bonded parts 214. In the case where the double-faced adhesive taps are previously bonded on the support substance 27 side, the double-faced adhesive tapes do not remain on the bonded parts 214 side of the back panel 21 when the support plate 27 is peeled off from the back panel 21, and the double-faced adhesive tapes are peeled off together with the support plate 27 of the storage phosphor sheet 28. Consequently, the cleaning processing of the bonded surfaces of the bonded parts 214 (the processing of cleaning the residuals of the previous double-faced adhesive tapes) becomes easy when the next storage phosphor sheet 28 is stuck.

Moreover, the back panel 20 may be configured to attract the support plate 27 by means of magnetic force without bonding the support plate 27 to the bonded parts 214 by means of the double-faced adhesive tapes, the bonding agent or the like for making the exchange of the storage phosphor sheet 28 easy. For example, magnets are bonded on parts (bonded surfaces to the bonded parts 214) of the back surface (the surface on which the storage phosphor sheet 28 is not stuck) of the support plate 27. On the other hand, the bonded parts 214 or the surfaces of the bonded parts 214 are made of a magnetic substance material. When such a configuration is adopted, it is possible to take off support plate 27 to which the storage phosphor sheet 28 is bonded from the back panel 20 easily. Moreover, it is needless to say that the similar effects can be obtained also by arranging a magnetic substance to parts of the back surface of the support plate 27 (bonded surfaces to the bonded parts 214) and by forming the bonded parts 214 or the surface parts of the bonded parts 214 by the use of magnets.

As the support plate 27, a light resin plate in thickness of about 0.7 mm to 1.2 mm which is uneasily deformed by changes of temperature and humidity and has a good planarity, such as a glass epoxy resin plate, a paper phenol resin plate and the like can be used. Moreover, as the support plate 27, a light metal plate made of aluminum or magnesium alloy may be used.

When a metal is used for the support plate 27, it is desirable to form small holes on the whole surfaces of the metal plate for weight saving.

The back panel body 21 is composed of a back panel back surface 210, a back panel side face 211, a rim 212, the ribs 215 and a magnetic substance sheet 29, such as iron foil. On the inside of the rim 212, a recess 22 is formed for receiving the shielding projection 115.

When the back panel 20 and the front panel 10 are united as shown in FIG. 2, the recess 22 of the back panel 20, and the shielding projection 115 and the rim 212 of the front panel 10 operate so that the shielding projection 115 enters into the recess 22 and rim 212 enters into the recess 12. By such a method, light shielding is performed lest outside light should arrive at the storage phosphor sheet 28. In the case where, for example, velvet, a sponge or the like is stuck in the recess 12 of the front panel 10, the light shielding performance can be further improved.

Moreover, as shown in FIG. 2, the front panel 10 and the back panel 20 are designed so that a gap having a certain degree of an interval is formed between the tip of the inclined face 112 of the front panel 10 and the inward face 113 of the frame 11, and the back panel side face 211 in the state in which the front panel 10 and the back panel 20 are united. This gap is one necessary for performing the uniting of the front panel 10 and the back panel 20 smoothly. As long as the interval of the gap is within a range of about 0.2 mm to 2 mm, the uniting of the front panel 10 and the back panel 20 can be performed sufficiently smoothly. Moreover, the gap is important for absorbing the manufacturing errors of the front panel 10 and the back panel 20 and for absorbing the thermal expansion of the back panel 20. Consequently, the gap improves the reliability and the stability of the uniting operation of the front panel 10 and the back panel 20.

Because this embodiment adopts the light shielding method based on the combination the recess and the projections as described above, there is no possibility that the outside light which has entered though the gap arrives at the storage phosphor sheet 28 to fog the storage phosphor.

Figure 6:
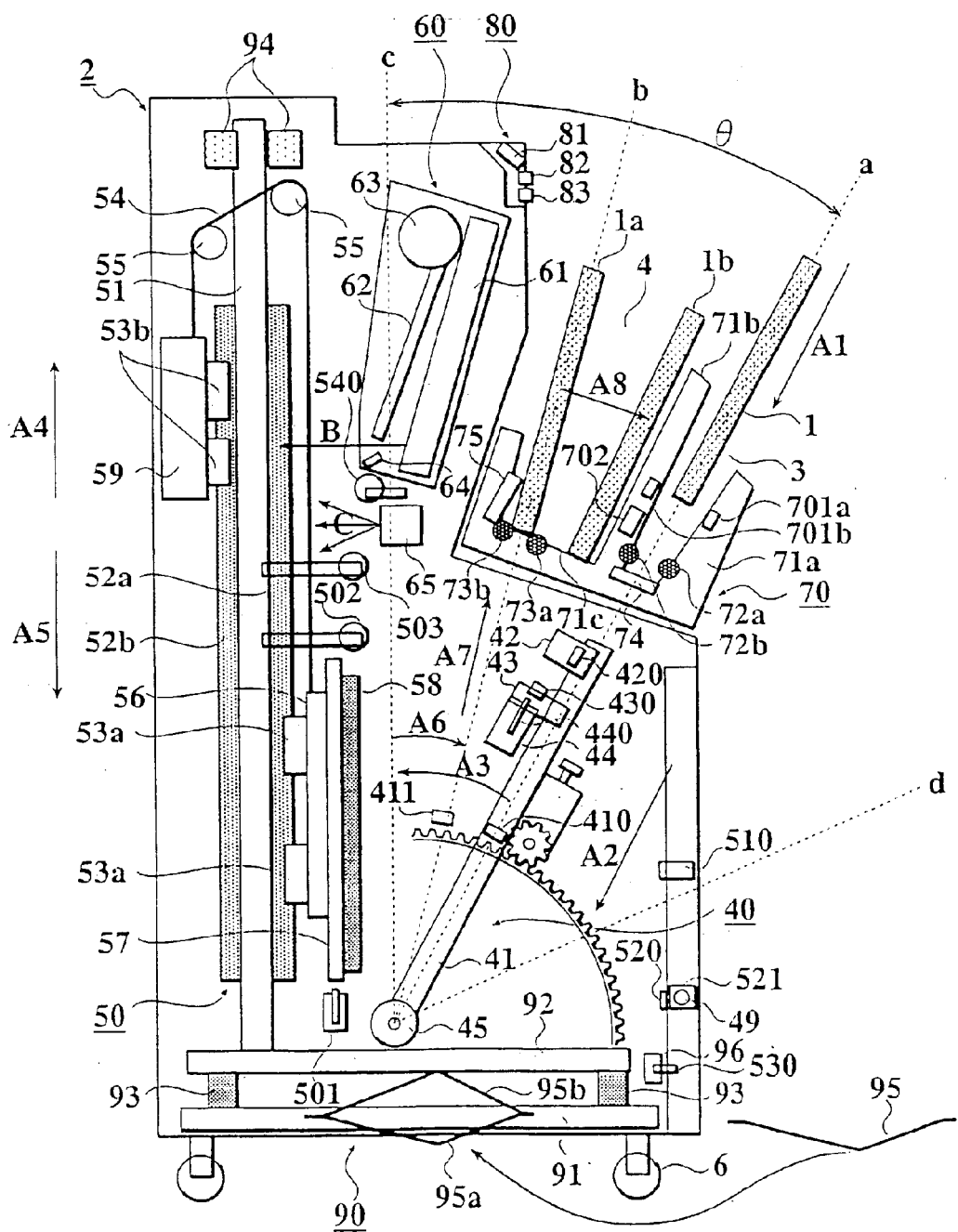
FIG. 6 is a view showing a configuration example of a radiographic image reading apparatus.

The back panel body 21 is, as shown in FIG. 2, configured to form the back panel body 21 with an ordinary plastic and to stick the magnetic substance sheet 29 such as the iron foil to the back panel back surface 210 so as to be able to be attracted to a magnet 58 shown in FIG. 6 by magnetic force. The surface of the magnetic substance sheet 29 is in the state of being covered by a not shown laminate plastic, or in the state of being coated by paint, and is thereby configured so that the magnetic substance sheet 29 is not exposed. For example, without sticking the magnetic substance sheet 29, the back panel body 21 itself maybe formed by means of a magnetic substance plastic or the like. Moreover, the method to coat a magnetic substance material on the back panel back surface 210 or the like may be used.

Moreover, the back panel back surface 210 is designed so that the back panel back surface 210 follows the plane formed by the magnet 58 when the back panel back surface 210 is attracted by the magnet 58. That is, the back panel 20 has rigidity to a certain degree and flexibility to the degree of making it possible to follow the plane formed by the magnet 58. By giving the flexibility to some degree to the back panel 20 as described above, even when the back panel 20 is deformed or warped by, for example, a secular change or a busy condition, the deformation or the warp of the back panel 20 is absorbed by following the plane on the magnet 58 side. Consequently, the surface of the storage phosphor sheet 28 can be always held as a plane at the reading of image information.

When the photographing at which a load is imposed on the front panel 10 side (bed photographing, full load photographing or the like) is performed, the front face plate 13 of the front panel 10 produces a great deal of warp to the back panel 20 side. When the rigidity of the back panel 20 is too high in this case, the back panel 20 keeps its planarity. Consequently the storage phosphor sheet 28 is pressed from both of the front panel 10 and the back panel 20 in a great deal, and thereby the storage phosphor is damaged. As described above, when the back panel 20 has both of a certain degree of the rigidity and a certain degree of the flexibility, the back panel 20 can bend to some extent to the direction to escape from the pressing of the front panel 10. Consequently, there is no chance of damaging the storage phosphor.

Of course, the back panel 20 should not have the flexibility to the extent more than that being necessary. When the back panel 20 has the flexibility to the extent more than that being necessary, the durability of the cassette 1 decreases. Moreover, when the back panel 20 has the flexibility to the extent more than that being necessary, the quantity of the looseness of the back panel 20 owing to the self weight of the back panel 20 becomes large to produce a problem in its light shielding performance, and to produce a problem in the planarity of the storage phosphor surface at photographing.

Moreover, the ribs 215 are formed on the back panel 21 with the object of completing to be light and of increasing its flexural strength, and with the object of braking the deformation quantity when the storage phosphor sheet 28 is pressed from the front panel 10 side. Moreover, lest the front face plate 13 should be contacted with the storage phosphor sheet 28 to damage the surface of the storage phosphor sheet 28 when the font face plate 13 is pressed from the front panel 10 side, the non-woven fabric 17 is arranged on the surface on the storage phosphor sheet 28 side of the front face plate 13. The non-woven fabric 17 is preferably in a size smaller than the front face plate 13 and larger than the phosphor coating surface of the storage phosphor sheet 28 (the size capable of covering the whole phosphor coating surface). When the non-woven fabric 17 is smaller than the phosphor coating surface, such a case is not preferable because the difference of X-ray absorption in the non-woven fabric 17 is recorded in the storage phosphor sheet 28 as image information. Moreover, when the non-woven fabric 17 has a weave texture, the X-ray absorption difference owing to the weave texture is recorded on the storage phosphor sheet 28 as image information. Accordingly, it is preferable to use a non-woven fabric having a weave texture as little as possible. Moreover, in the case where the non-woven fabric becomes nappy and fibers of the non-woven fabric float in an apparatus inner part to attach to a laser optical system, the laser strength at reading becomes uniform to cause an image to generate image defects such as vertical lines on the image. It is preferable to use the non-woven fabric 17 to be nappy as little as possible. Moreover, it is preferable to use a non-woven fabric which has received fuzz preventive processing such as the permeation of resin or the like into the non-woven fabric 17 and the performance of the surface treatment processing of the non-woven fabric 17.

Although the front panel 10 and the back panel 20 can be separated, ordinarily photographing using radiations is performed in the state in which the front panel 10 and the back panel 20 are uniting as shown in FIG. 2.

Next, by means of FIGS. 3A to 3H and FIGS. 4A and 4B, a lock mechanism of a cassette will be described.

A lock mechanism is prepared in the cassette 1 for keeping the front panel 10 and the back panel 20 in their uniting state. Reference numerals 30a, 30b, 30c and 30d designate lock claws of the back panel 20. The lock mechanism is configured so that the tip of each lock claw moves to the arrow Q1 direction or the arrow Q2 direction from opening parts 31a, 31b, 31c and 31d with lock ON/OFF operations.

Reference numerals 32a and 32b of the back panel 20 designate lock claws different from the lock claws 30a, 30b, 30c and 30d. The lock claws 32a and 32b are configured to slide into the arrow Q1 direction or arrow Q2 direction in opening parts 33a and 33b with lock ON/OFF operations.

The lock ON state indicates the state in which the tips of the lock claws 30a, 30b, 30c and 30d protrude to the outside of the back panel side face 211. At this time, the tip of each of the lock claws 30a, 30b, 30c and 30d is in the state of rushing into the locking recesses 16a, 16b, 16c and 16d of the front panel 10, respectively.

Sectional views of the cassette 1 on dotted lines U1 and U2 in FIG. 4A in time of the lock ON state are shown as FIGS. 3A and 3B, respectively.

In the lock ON state, the tips of the lock claws 32a and 32b are in the state in which they have moved into the arrow Q1 direction. In this time, the phases of the notches 15a and 15b (openings formed in the frame inward face 113 and the inclined face 112) of the front panel 10 and the phases of the lock claws 32a and 32b are in the state of not coinciding with each other. That is, the back panel 20 is in the state of being impossible to be separated from the front panel 10. Sectional views of the cassette 1 on dotted lines U3 and U4 in FIGS. 4A and 4B at this time are shown as FIGS. 3E and 3F, respectively.

The lock OFF state indicates the state in which the tips of the lock claws 30a, 30b, 30c and 30d enter into the inside of the back panel side face 211. Sectional views of the cassette 1 on dotted lines U1 and U2 in FIG. 4A at this time are shown in FIGS. 3C and 3D, respectively. Because the phases of the lock claws 32a and 32b and the phases of the notches 15a and 15b are in the state of coinciding with each other at this time, the back panel 20 can be separated from the front panel 10. Sectional views of the cassette 1 on dotted lines U3 and U4 in FIGS. 4A and 4B at this time are shown in FIGS. 3G and 3H, respectively.

The lock claws 30a, 30b, 32a and 32b are configured to interlock with a connecting member 35. On the other hand, the lock claws 30c and 30d are configured to interlock with a connecting member 36. One end of each of springs 38a is connected with the connecting member 35, and the other ends of the springs 38a are connect with the back panel body 21. The connecting member 35 always receives the force to urge to move in the arrow Q1 direction from the springs 38a. The insertion opening 14 of the front panel 10 is located in a positional relation corresponding to an insertion opening 34 of the back panel 20 at the uniting.

When a bar member is pushed only one time into an arrow P direction from the insertion opening 14 (insertion opening 34) in time of the lock ON state, the connecting member 35 moves into the arrow Q2 direction by a predetermined distance and stops in the state to stay in the lock OFF state shown in FIGS. 3C and 3D.

When the connecting member 35 has moved into the arrow Q2 direction, a rack-and-pinion operation is caused by the rack forms of the tips of the connecting member 35 and the connecting member 36 and a pinion 37, and the connecting member 36 also moves into an arrow R2 direction by the same distance and stops. At this time, the lock claws 32a and 32b move by the same distance into the arrow Q2 direction by interlocking with the connect member 35 and stops in the lock OFF state shown in FIGS. 3G and 3H.

That is, when the bar member is pushed only one time from the insertion opening 14 (insertion opening 34) into the arrow P direction in the lock ON state, the lock is shifted to the lock OFF state, and the front panel 10 and the back panel 20 become in the state capable of being separated. When the bar member is not operated next through the insertion opening 14 (insertion opening 34), the lock OFF state is continuously kept.

In time of lock OFF state, when the bar member is pushed only one time into the arrow P direction from the insertion opening 14 (insertion opening 34), the connecting member 35 moves into the arrow Q1 direction by the predetermined distance and stops in the state to shift to the lock ON state shown in FIGS. 3A and 3B.

When the connecting member 35 has moved into the arrow Q1 direction, the above-mentioned rack-and-pinion operation is caused, and the connecting member 36 also moves into the arrow R1 direction by the same distance and then stops. In this time, the lock claws 32a and 32b move into the arrow Q1 direction by the same distance, and become in the lock ON state shown in FIGS. 3E and 3F.

That is, in time of the lock OFF state, when the bar member is pushed only one time from the insertion opening 14 (insertion opening 34) into the arrow P direction, the lock state shifts to the lock ON state, and the front panel 10 and the back panel 20 become in the state of being impossible to be separated. When the bar member is not operated next from insertion opening 14 (insertion opening 34), the lock ON state is continuously kept.

As described above, the cassette 1 of this embodiment adopts the system (push and latch system) in which the lock ON state and the lock OFF state are switched every time when the bar member is inserted from the insertion opening 14 (insertion opening 34) and pushed. The push and latch system is well known as the mechanism of being used for putting in and out a core of a ball-point pen from the sleeve of the ball-point pen. The push and latch mechanism is involved in a push and latch section 39 of FIG. 4A. One ends of the springs 38b are connected to the push and latch section 39, and the other ends of the springs 38b are connected to the back panel body 21. The springs 38b always urges the push and the latch section 39 to move into the arrow Q1 direction.

The notches 15a and 15b of the front panel 10 and the lock claws 32a and 32b are arranged at positions distant from the central position C (the position indicated by an arrow C) on the side face side of the cassette 1 by predetermined distances. By the arrangement of the notches 15a and 15b and the lock claws 32a and 32b to be shifted from the central position C on the side face side of the cassette 1 (incidentally, if any one of the pairs of the lock claw 32a and the notch 15a and of the lock claw 32b and the notch 15b is shifted from the central position C of the side face side of the cassette 1, the other pair may be arranged on the central position C on the side face side of the cassette 1), the back panel 20 and the front panel 10 do not unite when their directions are not correct ones. Thereby, for example, it is possible to evade the risk of user's erroneous uniting of the back panel 20 and the front panel 10 in their directions when the user separates the cassette 1 for the cleaning of the inner part of the cassette 1, the replacement of the storage phosphor sheet 28, or the like, and tries to perform the uniting of the back panel 20 and the front panel 10 again after the termination of the work.

The mechanism for evading the risk of erroneous uniting of the back panel 20 and the front panel 10 in their directions is called as a reversal insertion prevention mechanism.

Moreover, at least one projection is formed on any one of the frame 11 of the front panel 10 (for example, on the inner surface of the frame side face 110, or on the inclined face 112 or the like) and the outer periphery section of the back panel (for example, on the outside face of the back panel side face 211), and at least one recess is formed on the other one, and further the projection and the recess are arranged to coincide with each other only when the front panel 10 and the back panel 20 are opposed at the correct directions. Thereby, it is possible to construct the reversal insertion prevention mechanism easily.

For example, a projection shaped in a similar form to those of the lock claws 32a and 32b is formed on the outside face of the back panel side face 211, and a recess shaped in a similar form to those of the notches 15a and 15b is formed on the frame 11 of the front panel 10. Then, the projection and the recess are arranged in the same positional relation as those of the lock claws 32a and 32b and the notches 15a and 15b in the lock OFF state. Thereby, the reverse insertion prevention mechanism can be constructed.

Moreover, when the lock mechanism is configured only by the lock claws 30a, 30b, 30c and 30d (in the state in which the lock claws 32a and 32b are not included), the side of the back panel 20 on which no lock claws reside loosens to vertically downward owing to the own weight of the back panel 20 when the cassette 1 is held so that the front panel 10 is directed to vertically upward. In such a way, the lock mechanism using the lock claws 32a and 32b can function also as a mechanism (loosening prevention mechanism) for preventing the loosening of the back panel 20 owing to its own weight.

Incidentally, the loosening prevention mechanism is not always necessary for the cassette 1 having a relatively small size in which the loosening of the back panel 20 owing to its own weight is rarely produced.

Moreover, in this embodiment, the insertion opening 14 and the insertion opening 34 are exhibited as rectangle forms. However, this exhibition does not mean that the insertion opening 14 and the insertion opening 34 are limited to the rectangle forms. For example, they may be shaped to be circular forms or the like.

FIGS. 5A and 5B are views showing the back panel 20 of the cassette 1 when it is looked at from the back side thereof (from the opposite side to the front panel 10). FIG. 5A indicates the lock ON state, and FIG. 5B indicates the lock OFF state.

A code storage element 200 is stuck on the back panel back surface 210 on the same side as that of the insertion opening 34. A clip 201 is arranged on the back panel back surface 210 on the opposite side to the code storage element 200.

In this embodiment, the code storage element 200 is a bar code label on which an optically readable pattern is printed. The code storage element 200 (bar code label) is bonded at a position distant from a corner of a cassette 1 by a predetermined distance X independent of the size of the cassette 1.

Moreover, an element capable of reading a code written in the code storage element 200 by means of radio techniques of electromagnetic waves, microwaves and the like may be used as the code storage element 200. When the element capable of reading a code by means of the radio techniques of electromagnetic waves, microwaves and the like, the code recorded in the code storage element 200 can be accurately read even when the positional relation between the code storage element 200 and a reading apparatus of the code storage element 200 is a little shifted. Consequently, such an element is convenient. As such an element, for example, an element called as a noncontact ID label (for example, S label) can be used.

When a code written in the code storage element 200 is read by means of the radio techniques of electromagnetic waves, microwaves and the like, the code storage element 200 may be arranged at the inner part of the back panel 20 in place of the back panel back surface 210. Because reading and writing are performed by the radio techniques, it is needless that the code storage element 200 resides on the back panel back surface 210. In this case, when a label on which the identification number (ID number) of the storage phosphor sheet 28 or the like is stuck on the back panel back surface 210, the ID number can be visually recognized. Consequently, it can be easily known.

When both of a bar code reading system and a reading system using the radio techniques are used together, it is more convenient. In this case, it is important that the contents of the bar code label and the contents recorded in the element read by means of the radio techniques correspond to each other.

In the code storage element 200, a number indicating the identification number (ID number), the date of manufacture and the lot number of a storage phosphor sheet 28, the version number of the storage phosphor, the size information of a cassette 1, the sensitivity correction information (or the sensitivity information) of the storage phosphor sheet 28, and the like is recorded as a code. When the sensitivity correction information (or the sensitivity information) of the storage phosphor sheet 28 is recorded, it is possible to read the information to correct the sensitivity of the storage phosphor. For example, by changing an voltage supplied to an photoelectric conversion element such as a photomultiplier tube and the like to change the reading sensitivity of the photoelectric conversion element, the dispersion of the sensitivity of the storage phosphor sheet 28 can be corrected to make it possible to read image information always at the fixed sensitivity. Such a sensitivity correction can be also achieved by, for example, performing the shift processing of digital data generated by performing the AD conversion of an output of a logarithmic amplifier in accordance with sensitivity information. In this case, it is needless to change the voltage to be applied to the photoelectric conversion element such as the photomultiplier tube and the like.

FIG. 6 is a view showing an embodiment of a radiographic image reading apparatus of the present invention.

In an apparatus body 2, a cassette insertion opening 3, a cassette ejection opening 4, a maintenance door 5 and casters 6 are prepared. Moreover, the apparatus body 2 is composed of a conveyance mechanism 40, a sub-scanning mechanism 50, a read mechanism 60, a cassette insertion and ejection section 70, a display and operation mechanism 80 and a body framework section 90. The cassette insertion and ejection section 70 is configured to be able to be removed from the apparatus body 2 easily.

Moreover, the sub-scanning mechanism 50 and the conveyance mechanism 40 are constructed on the same substrate 92 as that of the body framework section 90. By arranging a rubber vibration isolator 93 between the substrate 92 and a base plate 91, a vibro-isolating structure for preventing the propagation of the vibrations of the cassette insertion and ejection section 70 to the sub-scanning mechanism 50 is realized.

Moreover, a rubber vibration isolator 94 is arranged between the upper end of the sub-scanning mechanism 50 and a not shown apparatus frame. The rubber vibration isolator 94 is for strengthen the vibro-isolating structure to the sub-scanning mechanism 50.

By means of the vibro-isolating structure like this, it can be prevented that noises are generated in read image information owing to vibrations even when a cassette is inserted into the insertion opening 3, or when a cassette is taken out from the ejection opening 4, or further when the apparatus body 2 is vibrated while the image information is being read from the storage phosphor sheet 28 with the read mechanism 60.

Moreover, because the sub-scanning mechanism 50 and the conveyance mechanism 40 are constructed on the same substrate 92, a delivery position does not move when the back panel 20 is delivered from the conveyance mechanism 40 to the sub-scanning mechanism 50 as described later. Thereby, the work of the separation and the uniting of the front panel 10 and the back panel 20 can be performed stably and accurately.

Moreover, lest the mechanism on the conveyance mechanism 40 and the substrate 92 should interfere with each other when the conveyance mechanism 40 inclines, an opening part capable of making the mechanism on the conveyance mechanism 40 escape to the under surface side of the substrate 92 is formed in the substrate 92. Moreover, the base plate 91 also includes an opening part on the basis of the same reason. As described above, by the formation of the opening parts for making the mechanism on the conveyance mechanism 40 escape in the substrate 92 and in the base plate 91, it becomes possible to construct the apparatus body 2 having a low height.

However, the formation of the opening part in the base plate 91 causes a problem of the entering of outside light into the apparatus body 2. Accordingly, a removable light shielding plate 95 having a depression of a V letter form for covering the opening part in the base plate 91 is prepared, and is attached to the base plate 91 in the state of being projected downward as shown by a reference numeral 95a in FIG. 6. Thereby, the mechanism on the conveyance mechanism 40 is escaped to the under surface side of the base plate 91 while it can be prevented that the outside light enters into the apparatus body 2.

However, when the light shielding plate 95 is attached in the state of being projected downward as designated by the reference numeral 95a of FIG. 6, the projecting section of the light shielding plate 95 hinders when the apparatus body 2 is conveyed. Accordingly, when the apparatus body 2 is conveyed, the light shielding plate 95 is attached in the state of projecting upward as designated by a reference numeral 95b in FIG. 6. Thereby, the projection section of the light shielding plate 95 is not any hindrance when the apparatus body 2 is conveyed.

As described above, an opening part is formed in the base plate 91. The V letter formed light shielding plate 95 for shielding the opening part from light is configured to be able to be attached both in the states of being projected upward and of being projected downward. The light shielding plate 95 is attached to the base plate 91 to be projected upward at the conveyance of the apparatus body 2 and to be projected downward at an operation of the apparatus body 2. Consequently, the rotation and the movement of the conveyance mechanism 40 are allowed while the height of the apparatus body 2 can be lowered.

Next, the operations of a radiographic image reading apparatus of the present invention will be described by means of FIG. 6 to FIG. 12.

Figure 7:
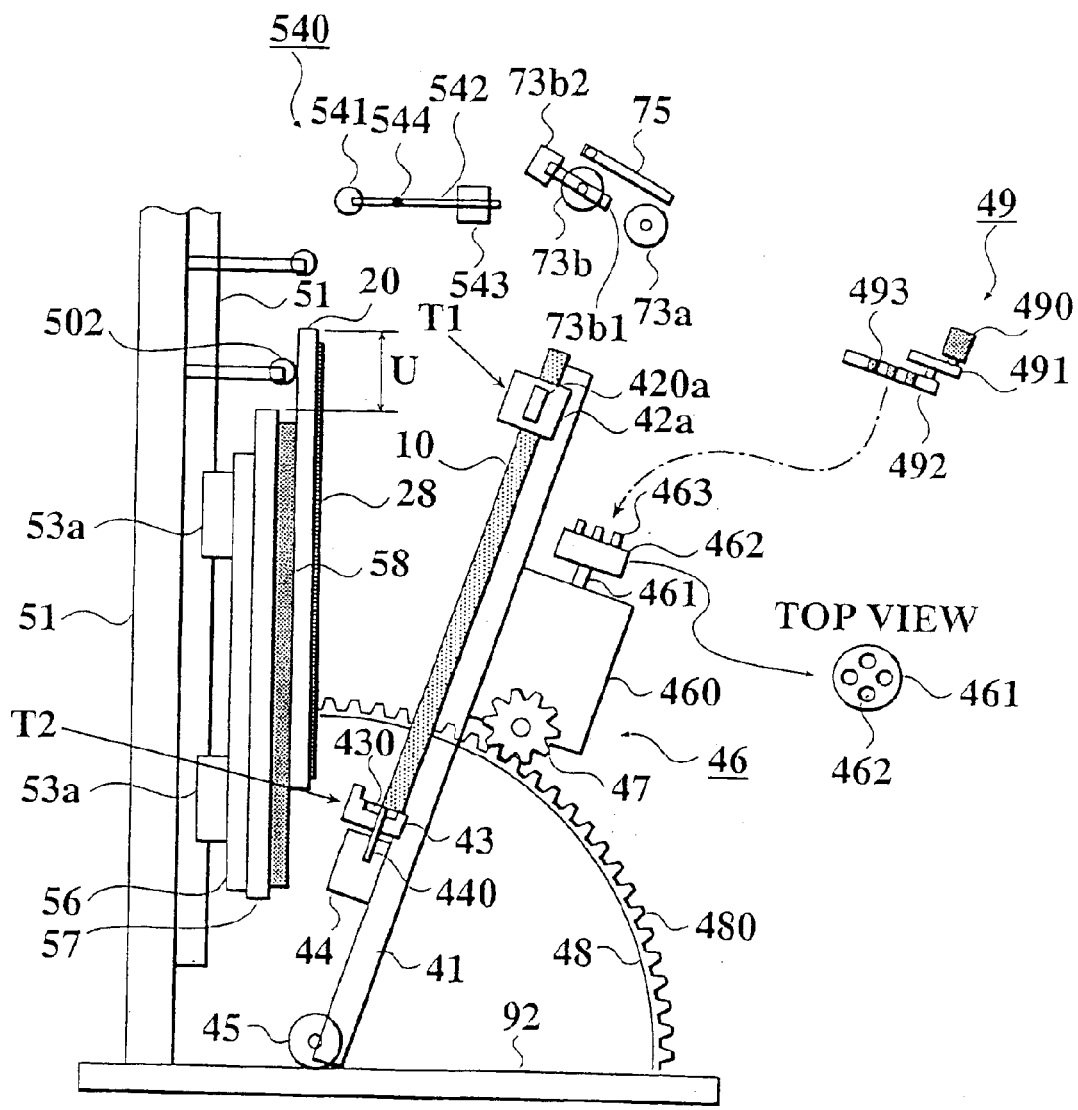
FIG. 7 is a view showing a relation between a conveyance mechanism and a sub-scanning mechanism.
Figure 8:
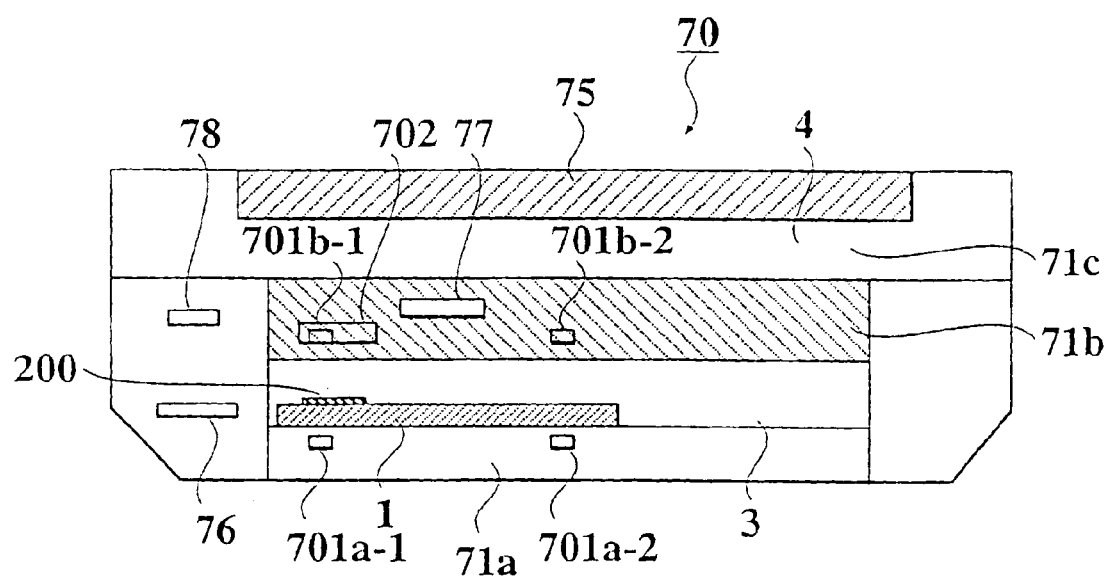
FIG. 8 is a view showing a cassette insertion and ejection section when the section is looked at from above.
Figure 10A:
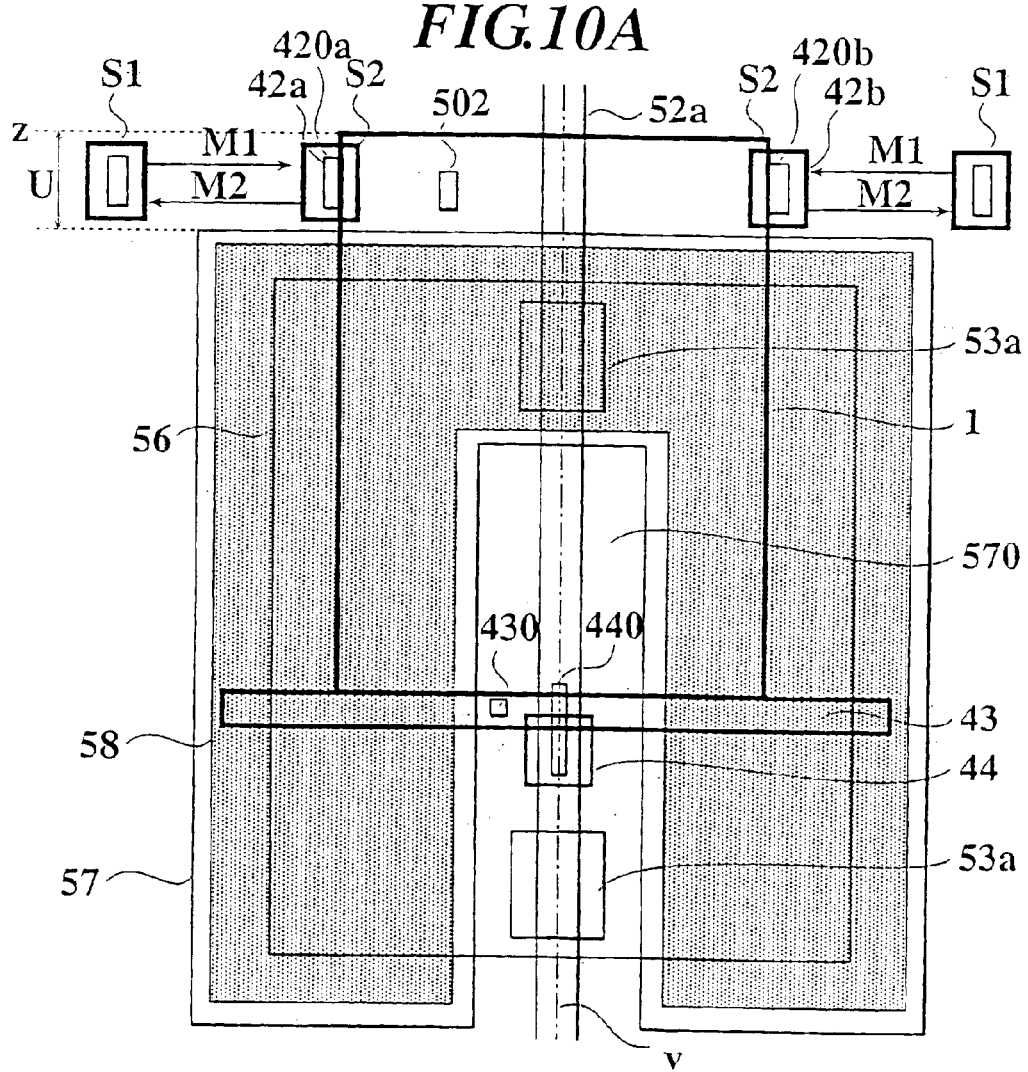
FIGS. 10A and 10B are vies showing a relation between the conveyance mechanism and the sub-scanning mechanism at the delivery of the back panel.
Figure 10B:
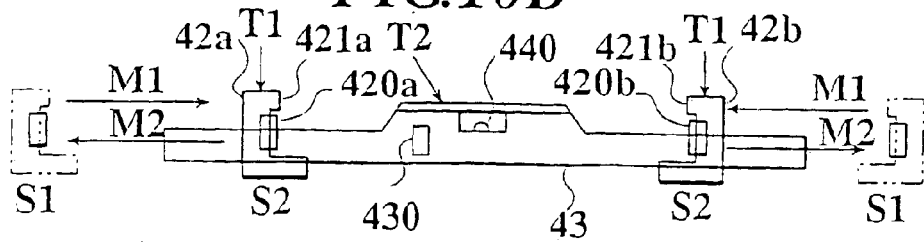
Figure 11:
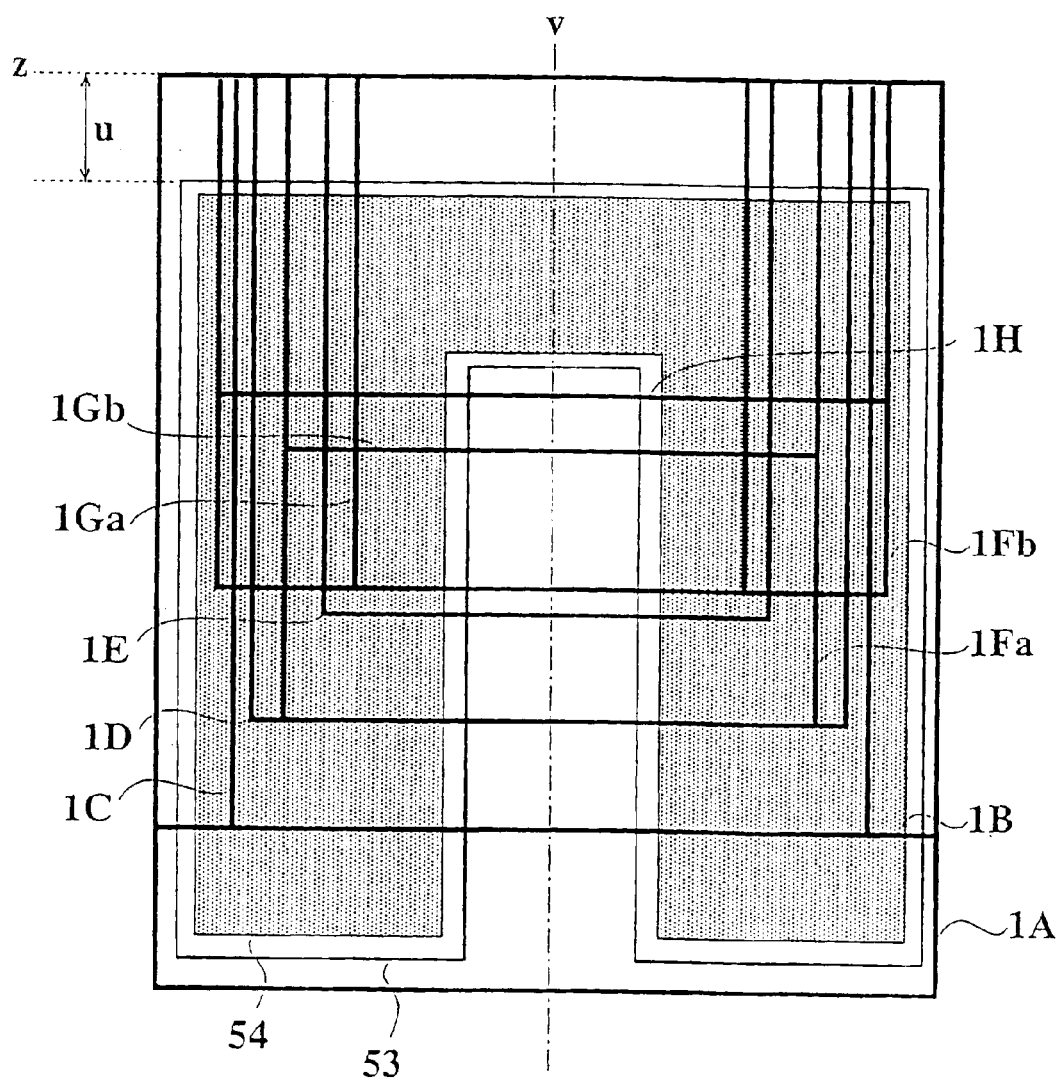
FIG. 11 is a view showing a positional relation of the cassette in case of an upper side reference and a center reference.
Figure 12:
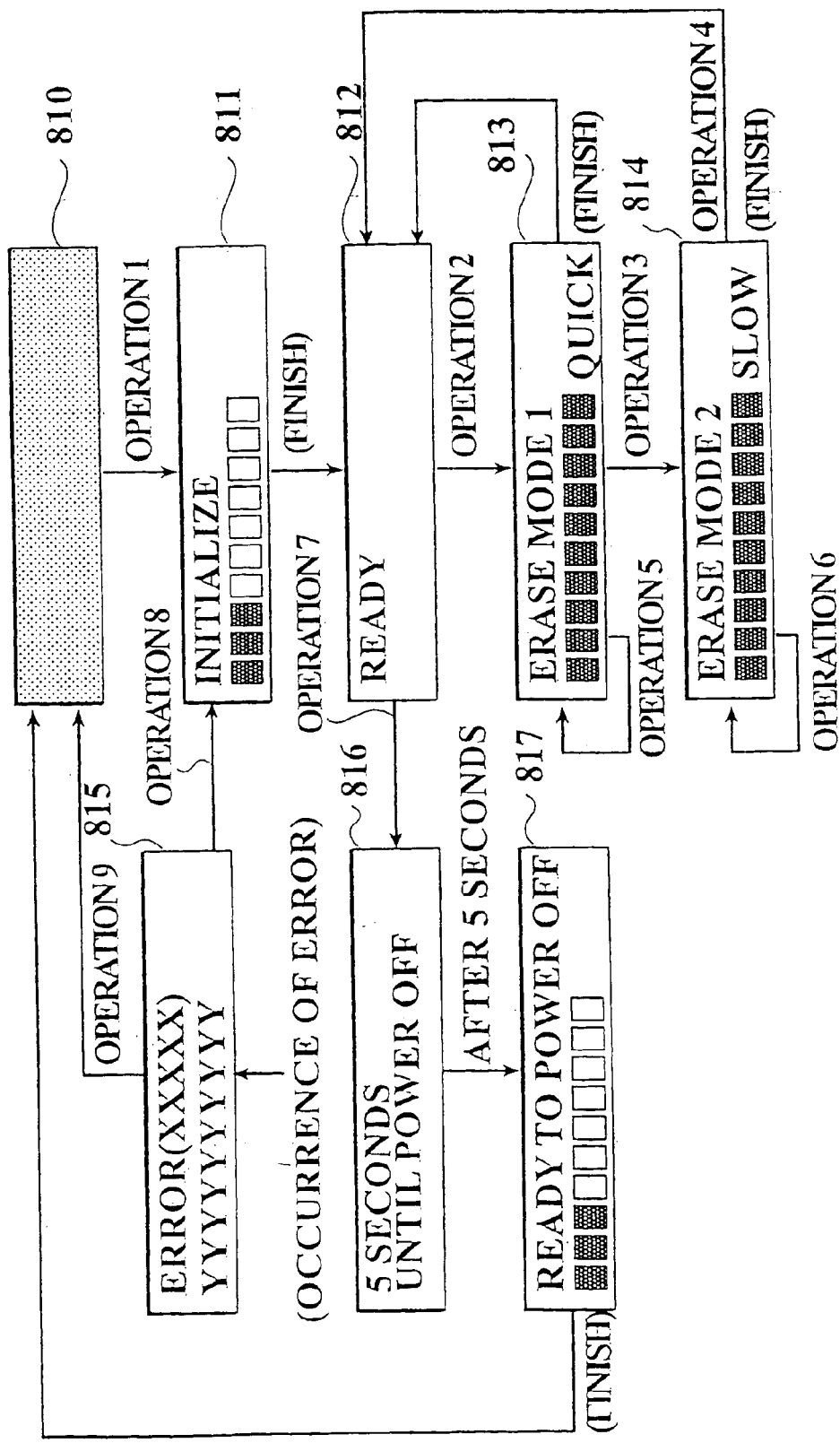
FIG. 12 is a transition diagram showing changes of the display contents of a display.

FIG. 7 is a view showing a relation between the conveyance mechanism 40 and the sub-scanning mechanism 50 of the radiographic image reading apparatus of the present invention. FIG. 8 is a view showing the cassette insertion and ejection section 70 of the radiographic image reading apparatus of the present invention when it is looked at from above. FIG. 9 is a view showing the display and operation section 80 of the radiographic image reading apparatus of the present invention when it is looked at from the front. FIGS. 10A and 10B are views showing a relation between the conveyance mechanism 40 and the sub-scanning mechanism 50 at the delivery of the back panel of the radiographic image reading apparatus of the present invention. FIG. 11 is a view showing a positional relation of the cassette 1 in case of an upper side reference and a center reference of the radiographic image reading apparatus of the present invention. FIG. 12 is a transition diagram showing changes of the display contents of a display 81 of the radiographic image reading apparatus of the present invention.

Fist, a not shown circuit breaker is tuned on for initiating the apparatus. Next, when an operation switch 82 shown in FIG. 9 is pushed (operation 1), a power source is supplied to a not shown control section of the apparatus body 2. An operation lamp 84 is lighted. At the same time, display indicating while initializing on the display 81 (an LCD panel in this embodiment) as shown in FIG. 9 or as designated by a reference numeral 811 in FIG. 12. At the same time, the initializing of the apparatus body 2 and of the not shown control section begin. For making the user know the lapse of time until the termination of initialization sufficiently, bar display using marks ■ and □ as shown in FIG. 9 or as designated by a reference numeral 811 in FIG. 12 is performed. Count down display by replacing a mark ■ with a mark □ one by one with the lapse of time from the state in which all marks are ■ to the state in which all marks are □ is performed. Alternatively, the lapse of time until the termination of the initialization may be displayed by means of the numbers of seconds. When the initialization terminates, the display of the display 81 changes to "READY" display as designated by a reference numeral 812 in FIG. 12, and it becomes possible to insert the cassette 1 into the apparatus body 2.

The radiographic image reading apparatus of the present invention includes at least two modes as its operation mode. One of them is a reading mode for reading image information from the storage phosphor sheet 28, the other one is an erase mode for erasing image information from the storage phosphor sheet 28. When an apparatus is initiated, the reading mode is automatically selected. Two kinds of erase modes are prepared as a MODE 1 (high speed erasing) and a MODE 2 (low speed erasing). The MODE 1 (high speed erasing) is the erase mode which is performed before radiation photographing or after the lapse of a fixed time after the reading of the image information at the last time. The MODE 1 is the erase mode to be used, for example, at the use of the radiographic image reading apparatus after erasing all of the storage phosphor sheets 28 at every morning. On the other hand, the MODE 2 (low speed erasing) is the erase mode to be used in the case where image information is not necessary, for example, when radiation photographing was mistaken.

Next, the erase modes and the transition of the contents displayed on the display 81 will be described by means of FIG. 12.

For shifting to the erase mode, an erase switch 83 of FIG. 9 is pushed for 3 to 5 seconds (operation 2). By the operation 2, the display of the display 81 changes from "READY" display to "ERASE MODE 1/■ ■ ■ ■ ■ ■ ■ ■ ■ ■ QUICK" display as designated by a reference numeral 813 in FIG. 12. Then, the radiographic image reading apparatus has shifted to the MODE 1 (high speed erasing) of the erase mode, and begins the countdown for 10 seconds in the display similar to that at the initializing (count down display by replacing a mark ■ with a mark □ one by one with the lapse of time from the state in which all marks are ■ to the state in which all marks are □ is performed). When the radiographic image reading apparatus is left for 10 seconds in the state, the apparatus automatically returns to the reading mode. When the erase switch 83 is pushed before 10 seconds have passed from "ERASE MODE 1/■ ■ ■ ■ ■ ■ ■ ■ ■ ■" display (operation 3), the display of the display 81 changes to "ERASE MODE 2/■ ■ ■ ■ ■ ■ ■ ■ ■ ■ SLOW" display. Then, the erase mode shifts to the MODE 2 (low speed erasing), and the countdown for 10 seconds begins. When the radiographic image reading apparatus is left for 10 seconds in the state, the apparatus automatically returns to the reading mode.

When the cassette 1 is inserted into the insertion opening 3 during the countdown (within 10 seconds after a mode transition) in both of the cases where the erase mode is the MODE 1 (high speed erasing) and where the erase mode is MODE 2 (low speed erasing) (operation 5 or operation 6), the cassette 1 is taken into the inner part of the apparatus body 2, and erasing is performed. When the erasing completed and the next erasing becomes possible, the display 81 again displays countdown. After that, by the insertion of the next cassette 1 into the insertion opening 3 by the termination of the countdown similarly, erasing work can be continuously performed.

As described above, because the radiographic image reading apparatus is configured to perform countdown for 10 seconds when the apparatus enters into the erase mode and to perform the erasing continuously when the cassette 1 is inserted into the insertion opening 3 before the termination of the countdown, it is possible to save the trouble of reentering into the erase mode at every erasing when a user wants to erase a plurality of sheets continuously. Moreover, because the radiographic image reading apparatus is configured to return to the reading mode automatically when the cassette 1 is not inserted into the insertion opening 3 before the termination of the countdown for 10 seconds, the risk of erroneously erasing the storage phosphor sheet 28 which is wanted to be read after the termination of erasing work is removed.

When a user wants to terminate the work of the radiographic image reading apparatus (wants to turn off the power), the user push the operation switch 82 for 5 seconds (operation 7). By the operation, the display 81 displays "5 seconds until power OFF", and the display section of the number of seconds changes to 5, 4, 3, 2 and 1 sequentially. After the lapse of 5 seconds, "ready to power OFF" display appears. At the appearance of the display, countdown begins. When the preparation of the power OFF has been completed, the display 81 enters in its light-out state, and the power source which has been supplied to the control section of the apparatus body 2 is cut off.

When an error is once produce in any states or any modes, the operation of the radiation image reading apparatus stops, and the error message designated by a reference numeral 815 shown in FIG. 12 is displayed by the display 81. Hereupon, "XXXXX" indicates a part to which an error code is displayed, and "YYYYYYYYYY" indicates a part showing an operation which a user should do or a part where work contents are displayed. Because the display 81 of the apparatus body 2 displays an operation which the user should do or the work contents together with an error code, the user can instantaneously perform the return from the error.

Next, FIG. 6 is used while the reading operation in the reading mode of the radiographic image reading apparatus is described. Incidentally, the erasing operation in the erase mode is similar to the contents which will be described in the following as to the insertion operation and the ejection operation of the cassette 1 and the movement of the cassette 1 in the inner part of the apparatus.

As shown in FIG. 6, a cassette 1 to which radiation image photographing has been performed is inserted into the insertion opening 3 along an arrow A1 direction. At this time, the insertion is performed so that the insertion opening 14 is located on the lower side and the front face plate 13 of the front panel 10 faces to the obliquely lower side. That is, the insertion is performed so that the reading surface of the storage phosphor sheet 28 faces to the obliquely lower side. Moreover, the cassette 1 is inserted along the wall on the left side of the insertion opening 3 to be flush against the left in this embodiment.

A cassette detection sensor 701 in which a light emission section 701a and a light reception section 701b operate as a pair is arranged in an insertion guide section 71a of the cassette insertion and ejection section 70. The reference numeral 701a designates the light emission section for emitting infrared light, and the reference numeral 701b designates the light reception section for receiving the infrared light emitted from the light emission section 701a. When the cassette 1 is inserted into the insertion opening 3, the infrared light emitted from the light emission section 701*a* of the cassette detection sensor 701 is intercepted by the cassette 1, and the light does not arrive at the light reception section 701*b* of the cassette detection sensor 701. The apparatus body 2 detects the insertion of the cassette 1 by means of the interception of the infrared light as a cassette detection signal.

At least two pairs of the cassette detection sensors 701 are prepared as shown in FIG. 7. That is, a pair of a light emission section 701*a*-1 and a light reception section 701*b*-1 is arranged on the left side of the insertion opening 3. A pair of a light emission section 701*a*-2 and a light reception section 701*b*-2 is arranged at the center of the insertion opening 3. Only in the case where all of the at least two pairs of the cassette detection sensors 701 output the detection signal, an insertion roller 72*a* is actuated by a not shown insertion motor. The actuating of the insertion roller 72*a* in turn conveys the cassette 1 into the arrow A1 direction, and then the tip of the cassette 1 arrives at an insertion opening shutter 74. By actuating the insertion roller 72*a* for a while after the tip of the cassette 1 has arrived at the insertion opening shutter 74, it is possible to align the cassette 1 to be horizontal against the insertion opening shutter 74 even if the cassette 1 is inserted in the state of being inclined. An insertion roller 72*b* is a driven roller, and the cassette 1 is nipped by the insertion rollers 72*a* and 72*b* with the force sufficient for the conveyance.

When at least one pair of the cassette detection sensor 701 of the at least two pairs of the cassette detection sensors 701 does not output the detection signal, the radiographic image reading apparatus recognizes that the cassette 1 was not inserted to be flush against the left side, and displays a warning message indicating the insertion of the cassette 1 to be flush against the left side on the display 81 (a liquid crystal panel capable of displaying letters and signs in this embodiment). As in this embodiment, by the arrangement of the pair of the cassette detection sensors 701*a*-2 and 701*b*-2 by the insertion opening 3, even when the cassette 1 having any size is inserted from any direction, the cassette detection sensors 701*a*-2 and 701*b*-2 output a detection signal without fail. Consequently, even when the cassette 1 is not inserted in the state of being flush against the left side, the warning message indicating the insertion of the cassette 1 in the state of being flush against the left side can be displayed without fail.

Moreover, because an insertion opening indicator 76 turns on and off and a warning beep sound simultaneously to the display of the warning message, the user never overlooks the occurrence of the abnormal insertion of the cassette 1.

As described above, because the abnormal insertion of the cassette 1 is informed immediately after the insertion of the cassette 1 (before a part of the cassette 1 is wholly taken into the apparatus body), the user can immediately perform a correction measure such as the reinsertion of the cassette 1, the making of the cassette 1 to be flush against the left side, or the like without losing time.

When the rotation of the not shown insertion motor, which begins at the detection of the cassette 1, stops, a code read member 702 reads the above-mentioned various kinds of information including the size information of the cassette 1 from the code storage element 200 of the cassette 1. In this embodiment, the code storage element 200 is the bar code label, and the code read member 702 is a bar code reader. However, the code storage element 200 and the code read member 702 are not limited to the above-mentioned ones.

FIG. 8 is a view showing the cassette insertion and ejection section 70 looked at from above. This embodiment is configured as follows. That is, because the code read member 702 is arranged on the left side of the insertion opening 3, by inserting the cassette 1 in the state of being flush against the left side of the insertion opening 3, the position of the code storage element 200 (bar code label) faces to the code read member 702 (bar code reader), and the code storage element 200 (bar code label) enters into the range where the code read member 702 (bar code reader) can read the code storage element 200. Because the width of the code of the code storage element 200 (the width of the bar code label) is configured to be a size smaller than the range where the code read member 702 (bar code reader) can read the code storage element 200, even if the insertion position of the cassette 1 is shifted a little, namely if the cassette 1 is separated from the left side wall of the insertion opening 3 a little, the information of the code storage element 200 (bar code label) on the cassette 1 can be accurately read by the code read member 702 (bar code reader). Owing to the configuration described above, the user is not necessary for paying attention to the insertion of the cassette 1, and the stress for inserting the cassette 1 can be reduced.

In this embodiment, the cassette 1 is inserted into the insertion opening 3 in the state of being flush against the left side, but it is needless to say that the cassette 1 may be inserted into the insertion opening 3 in the state of being flush against the right side. In this case, the code read member 702 is arranged on the right side of the insertion opening 3.

The insertion opening indicator 76 is arranged in the cassette insertion and ejection section 70. In the state in which the cassette 1 can be inserted into the insertion opening 3, i.e. in the state in which no cassette 1 resides in the insertion opening 3 and the insertion opening shutter 74 is closed, the insertion opening indicator 76 lights, and the display 81 performs the display indicating the state in which the cassette 1 can be inserted, for example, the display of READY.

In case of the state in which the insertion of the cassette 1 into the insertion opening 3 is prohibited, i.e. in case of the state in which the cassette 1 resides in the insertion opening 3, or in the midst of taking the cassette 1 into the inner part of the apparatus body 2, or in the state in which the insertion opening shutter 74 is opened immediately after the cassette 1 is taken into the inner part of the apparatus body 2, then the insertion opening indicator 76 performs light-out, and the display 81 performs the display indicating the state in which the insertion of the cassette 1 is prohibited, for example, the display of BUSY.

Moreover, in case of the abnormal insertion of the cassette 1, or in case of the abnormal insertion of something other than the cassette 1, the insertion opening indicator 76 turns on and off, and the display 81 displays a warning error message indicating the occurrence of the abnormal insertion, and further a warning beep is sounded. Thereby, the user is informed of the occurrence of the abnormal insertion. In such a way, in case of the detection of the abnormal insertion of the cassette 1, the cassette 1 is not taken in the inner part of the apparatus body 2.

Hereupon, the abnormal insertion indicates the following cases.

1) The case where at least one pair of sensor in the at least two pairs of the cassette detection sensors 701 did not output the detection signal (the case where the insertion of the cassette 1 in the state of being flush against the left side was not performed, or the like). In this case, the display 81 displays a warning error message indicating the insertion of the cassette 1 in the state of being flush against the left side.

2) The case where the code read member 702 could not read any codes, or read an indistinguishable code. In this case, the display 81 displays a warning error message indicating the occurrence of a read error of the code storage element 200 (the bar code in this embodiment).

The following cases can be considered as the case in which the code read member 702 cannot read a code, or the case where the code read member 702 reads an indistinguishable code.

1) The case where the cassette 1 was inversely inserted.
2) The case where the cassette 1 was inserted upside down.
3) The case where a different cassette or something heterogeneous was inserted.
4) The case where the code recorded in the code storage element 200 (bar code label) became dirty or was broken.
5) The case where the code storage element 200 (bar code label) is not stuck, or is not located at a correct position.

When the code read member 702 read a code correctly, the insertion opening shutter 74 is opened, and the not shown insertion motor actuates the insertion roller 72a to take the cassette 1 into the apparatus body 2 along the dotted line "a" in an arrow A2 direction.

When the cassette 1 has been taken in the inner part of the apparatus body 2, the insertion opening shutter 74 is closed, and the insertion opening indicator 76 in FIG. 8 is lighted (the insertion opening indicator 76 is lighted in the state in which the cassette 1 can be inserted, and puts out light in the state in which the insertion of the cassette 1 is prohibited). Then, the cassette insertion and ejection section 70 becomes the state in which the next cassette 1 can be inserted. When the next cassette 1 is inserted at this point of time (the insertion opening indicator 76 puts out light at this point of time), and when abnormal insertion of the cassette 1 does not happen, the insertion rollers 72a and 72b operate, and thereby the cassette 1 proceeds to a read position of the code storage element 200 by the code read member 702 to stop in the state being nipped by the insertion rollers 72a and 72b. At this point of time, the code storage element 200 is read by the code read member 702. When normal reading has been confirmed, the cassette 1 inserted after the first one continues to waiting at the insertion opening 3 until the apparatus body 2 enters in the state capable of receiving the second cassette 1 (until a rotation movement body 41 returns to the position of the dotted line "a" in FIG. 6 to enter in its waiting state after the reading of the cassette 1 taken in the inner part of the apparatus body 2 first has been completed and the cassette 1 has been ejected through the ejection opening 4). When the apparatus body 2 enters in its state capable of receiving the second cassette 1, the second cassette 1 is taken in the inner part of the apparatus body 2. Because two cassettes 1 can be accepted almost continuously in such a way, the working efficiency is improved. Moreover, when an ejection switch 78 is pushed in the state in which the cassette 1 stops in the state of being nipped by the insertion rollers 72a and 72b, the insertion rollers 72a and 72b reversely rotate to eject the cassette 1 to the insertion opening 3. Consequently, the ejection function of the cassette 1 by the ejection switch 78 is useful for the case where it is found that the cassette 1 was erroneously inserted.

The rotation movement body 41 of the conveyance mechanism 40 has been already waiting at the position of the dotted line "a" at the point of time when the insertion roller 72a starts, and the cassette 1 to be carried in through the insertion opening 3 with the insertion rollers 72a and 72b is received by an elevating platform 43 which moves up and down along the rotation movement body 41. An elevating platform sensor 430 is arranged on the elevating platform 43. When the elevating platform sensor 430 detects the tip of the cassette 1, the elevating platform 43 operates at almost the same speed as the taking speed of the cassette 1, and descends on the rotation movement body 41 together with the cassette 1. The elevating platform 43 is controlled so that the upper end of the cassette 1 stops at the position designated by a reference letter Z in FIGS. 10A and 11 in accordance with the cassette size information read from the code storage element 200.

When the upper end of the cassette 1 stops at the position indicated by the reference letter Z in FIGS. 10A and 11, width shifting members 42a and 42b operate according to the cassette size information read from the code storage element 200. That is, the width shifting members 42a and 42b staying at sheltering positions S1 in FIGS. 10A and 10B move into arrow M1 directions, and stop at positions S2 where the cassette 1 is held. At this time, width shift sensors 420a and 420b are turned on from their OFF states. When the width shift sensors 420a and 420b are not turned on, the display 81 displays the error information and the radiographic image reading apparatus stops its operation.

When the width shifting members 42a and 42b is staying at the positions S2 where the cassette 1 is held, the width shifting members 42a and 42b hold the cassette 1 in the form of holding only the frame 11 of the front panel 10 with projection sections 421a and 421b on a T1 surface side shown in FIG. 10B. In this time, because the width shifting members 42a and 42b do not hold the back panel 20, by releasing the lock of the cassette 1, the back panel 20 can be taken off without being interfered by the projection sections 421a and 421b of the width shifting members 42a and 42b. As described above, because the width shifting members 42a and 42b are configured to hold only the front panel 10 and not to hold the back panel 20, the width shifting mechanism and the holding mechanism of the cassette 1 can be made to be commonly used, and then the number of the parts of the apparatus can be curtailed and the control of the apparatus can be simplified.

FIG. 11 is a view showing how positional relations of different cassette sizes are on the rotation movement body 41. A reference numeral 1A designates a 14×17 inch size cassette. A reference numeral 1B designates a 14×14 inch size cassette. A reference numeral 1C designates an 11×14 inch size cassette. A reference numeral 1D designates a 10×12 inch size cassette. A reference numeral 1E designates an 8×10 inch size cassette. A reference numeral 1Fa designates a 24×30 cm size cassette. A reference numeral 1Fb designates a 24×30 cm size cassette for mammography. A reference numeral 1Ga designates an 18×24 cm size cassette. A reference numeral 1Gb designates an 18×24 cm size cassette for mammography. A reference numeral 1H designates a 15×30 cm size cassette for dental use. The position of the elevating platform 43 is controlled so that the upper ends of all of the cassettes are located at the position of an arrow Z independent of their sizes. It is supposed that the control method for controlling the upper ends of the cassettes 1 always stop at the same place of the rotation movement body 41 as described above is called as upper side reference control.

The advantages of the upper side reference control are the following two.

1) Because the time during which the sub-scanning mechanism 50 conveys the back panel 20 to a read position B can be minimized independent of cassette sizes, the processing ability (throughput) of the apparatus can be improved.

2 ) Because the upper ends of the back panels 20 can be projected from a sub-scanning movement plate 57 by the same distance U independent of cassette sizes (see FIGS. 7, 10A, 10B and 11), the T1 faces of the tips of the width shifting members 42a and 42b (see FIGS. 7 and 10B) can be made to escape to the interior side of the apparatus more than the positions of the sub-scanning movement plate 57 and the magnet 58 without being interfered by the sub-scanning movement plate 57 and the magnet 58. Moreover, the width shifting members 42a and 42b can hold the cassette 1 in the form of holding the frame 11 of the front panel 10 of the cassette 1 with the projection sections 421a and 421b without being interfered by the sub-scanning movement plate 57 and the magnet 58.

Of course, a lower side reference control method, i.e. a control method for controlling the position of the elevating platform 43 so that the lower ends of the cassettes 1 always stop at the same place of the rotation movement body 41 may be adopted. In this case, because the elevating platform 43 can be descended to the lower end of the apparatus independent of the size of the cassette 1, the control of the mechanism can be simplified. Incidentally, the two advantages described above cannot be obtained.

A dotted line V shown in FIGS. 10A and 11 is the center line of the sub-scanning movement plate 57. The width shifting members 42a and 42b are controlled so that the centers of all of the cassettes 1 coincide with the center line of the sub-scanning movement plate 57. That is, when the taking of the cassette 1 into the inner part of the apparatus body 2 is terminated, as shown in FIGS. 10A and 10B, the width shifting members 42a and 42b move from the sheltering positions S1 to the directions designated by the arrows M1, and stop at the positions S2 where the cassette 1 is held (the cassette 1 shown in FIG. 10A is supposed to the one of 8×10 inch size). The cassette 1 positioned on the left side on the elevating platform 43 during the time moves to the central position on the elevating platform 43. After this, all of a series of processing of the conveyance of the cassette 1 on the conveyance mechanism 40, the sub-scanning of the back panel 20 by the sub-scanning mechanism 50, and then ejection of the cassette 1 is performed at the central position. This is called as center reference control. As described above, when the cassette 1 is inserted into the insertion opening 3, the cassette 1 is inserted in the state of being flush against to the left side (this insertion is called as one side reference control). The one side reference control is changed to the center reference control at the point of time when the cassette 1 is taken into the inner part of the apparatus body 2.

Ordinarily, when a film is conveyed, or when a storage phosphor sheet is conveyed, the one side reference control by which the film or the storage phosphor sheet is conveyed in the state of being flush to one side is performed. In this embodiment, because the conveyance mechanism 40 (rotation movement body 41) and the sub-scanning mechanism 50 should treat various sizes of the cassette 1 and the back panel 20, the positions of the centers of gravity of the cassette 1 and the back panel 20 in the horizontal direction and the center of the sub-scanning movement plate 57 do not coincide with each other by the one side reference control. Consequently, there is the possibility that the balance of the sub-scanning which requires precise conveyance is lost to generate nonuniformity of speed at reading. Moreover, because the back panel 20 to which the storage phosphor sheet 28 is attached weights fairly heavily in comparison with a film or a simple substance of the storage phosphor sheet, the bad balance of the one side reference control is not preferable in points of the reliability and the stability. Consequently, in this embodiment, the center reference control is preferable.

However, as to the insertion of the cassette 1, as described above, it is preferable to perform the one side reference control. That is, by the one side reference control (the control in which the cassette 1 is inserted into the insertion opening 3 in the state of being flush against the left side or the right side), the code storage element 200 (bar code label) can be configured so that the position of the code storage element 200 faces to the code read member 702 (bar code reader) and the code storage element 200 is located in the range where the code storage element 200 can be read by the code read member 702. When the insertion of the cassette 1 is performed by the center reference control, at the step of the insertion of the cassette 1 into the insertion opening 3, the positions of the code storage element 200 and the code read member 702 shift to each other to increase the occasions at which the code of the code storage element 200 cannot be read. Accordingly, a certain cassette position adjusting mechanism becomes necessary before the read of the code storage element 200, which makes the apparatus complicated to decrease the reliability.

However, in the view of easiness of the user's insertion of the cassette 1, it is preferable that no reference is set for the insertion of the cassette 1 and the cassette 1 can be inserted at an arbitrary position of the insertion opening 3. As a mechanism for realizing this, it is considerable that a non-contact ID label (for example, S label) is used to the code storage element 200. In this case, because the code read member 702 reads the information recorded in the code storage element 200 by the use of the radio techniques of the electromagnetic waves, the microwaves or the like, there is no problem even if the positional relation between the code read member 702 and the code storage element 200 is shifted a little.

When an element requiring optical reading such as a bar code is selected as the code storage element 200, the radiographic image read apparatus may be configured to read the information of the code storage element 200 after the cassette 1 has been aligned in the insertion opening 3 or in the inner part of the apparatus body 2 by the center reference or the one side reference.

Moreover, when the back panel 20 is delivered between the conveyance mechanism 40 (rotation movement body 41) and the sub-scanning mechanism 50, a T2 surface of the elevating platform 43 and the sub-scanning movement plate 57 (or the magnet 58) interfere the deliverance of the back panel 20. Accordingly, an interference evading opening 570 is formed in the sub-scanning movement plate 57 (see FIG. 10A) for a measure to evade this. Because the position of the interference evading opening 570 cannot be specified by the one side reference control and more complicated mechanism becomes necessary, the center reference control is preferable in this embodiment in this sense also.

This embodiment adopts the center reference control. However, even when the one side reference control which evades the above-mentioned problems is performed, the essence of the present invention is not lost.

The rotation movement body 41 of the conveyance mechanism 40 includes a rotation shaft 45. The rotation movement body 41 can freely rotate to move at least in the range from the dotted line "a" to a dotted line "c" (the range of angle θ) around the rotation shaft 45 as the rotation center by being actuated by a conveyance motor unit 46. The rotation to move the rotation movement body 41 is implemented by the operation in which the conveyance motor unit 46 actuates a pinion gear 47 and the pinion gear 47 in turn rotate to move on rugged form rack teeth 480 formed on the circular arc of a rotation support plate 48.

When the cassette 1 is taken in the inner part of the apparatus body 2 by the conveyance mechanism 40, the conveyance motor unit 46 is actuated to rotate the pinion gear 47. The rotation movement body 41 rotates to move from the position of the dotted line "a" in FIG. 6 to the position of the dotted line "c" in an arrow A3 direction around the rotation shaft 45 as the rotation center. When the rotation movement body 41 has rotated to move to the position of the dotted line "c", the back panel back surface 210 of the cassette 1 including a magnetic substance is attracted by the magnetic force of the magnet 58.

In this time, by the mechanism (not shown) in which the front panel 10 of the cassette 1 is pressed to the magnet 58 side by the spring pressure for controlling the pressing quantity of the cassette 1 to the magnet 58, the cassette 1 is pressed to the magnet 58 side.

A lock opening and closing mechanism 44 and a lock pin 440 for turning on or off the lock mechanism of the cassette 1 are arranged on the elevating platform 43. By the up and down movement of the lock pin 440, the lock mechanism of the cassette 1 can be turned on or off.

The sub-scanning mechanism 50 is composed of a support pole 51, sub-scanning rails 52a and 52b, sub-scanning movable sections 53a and 53b, pulleys 55, a steel band 54, a sub-scanning movement plate fixing member 56, the sub-scanning movement plate 57, the magnet 58, a balancing weight 59, and an actuating section (not shown) composed of a sub-scanning motor and a speed reducer. The sub-scanning movement plate 57 is fixed to the sub-scanning movable sections 53a with the sub-scanning movement plate fixing member 56 put between them. Both of the ends of the steel band 54 are fixed to the sub-scanning movement plate fixing member 56 and the balancing weight 59. The pulleys 55 are connected to the not shown actuating section, and the pulleys 55 transmit the power of the not shown actuating section to the steel band 54. The sub-scanning movement plate 57 and the balancing weight 59 severally move up and down on the sub-scanning rails 52a and 52b by receiving the power of the not shown actuating section. A linear guide and a linear bearing guide which have high conveyance performance can be used as the sub-scanning rails 52a and 52b. A planetary roller speed reducer, a pulley speed reducer and the like can be used as the not shown speed reducer.

In this embodiment, the magnet 58 is a rubber magnet (permanent magnet) having a predetermined area. A sheet of the rubber magnet including the interference evading opening 570 as shown in FIG. 10A may be stuck to the whole surface of the sub-scanning movement plate 57, or a predetermined sheets of divided rubber magnet may be stuck to the sub-scanning movement plate 57. Moreover, the rubber magnet can take an arbitrary form. Moreover, a permanent magnet or an electromagnet may be used in place of the rubber magnet.

The surface section of the magnet 58 which attracts the back panel back surface 210 has high planarity. When the magnet 58 attracts the back panel back surface 210, the magnetic substance surface of the back panel back surface 210 is conformed to the plane of the magnet 58. By utilizing the phenomenon, the reading surface of the storage phosphor sheet 28 is taken into consideration so as to be a plane as perfect as possible. Consequently, even when the back panel 20 is deformed or warped, the deformation or the warp is corrected at the point of time when the back panel back surface 210 is attracted by the magnet 58, and then the read surface of the storage phosphor sheet 28 can secure its planarity.

When the back panel 20 is attracted by the magnet 58, the lock pin 440 housed in the lock opening and closing mechanism 44 attached to the elevating platform 43 ascends, and the tip of the lock pin 440 is inserted into the insertion opening 14 of the front panel 10. By this operation, the lock of the cassette 1 being in the lock ON state is released to shift to be in the lock OFF state. That is, the back panel 20 and the front panel 10 become in the state capable of being separated. When the cassette 1 has shifted to the lock OFF state, the lock pin 440 descends to be housed in the lock opening and closing mechanism 44 again.

When the lock of the cassette 1 has been released and the cassette 1 has shifted to be in the lock OFF state, the rotation movement body 41 rotates to move into an arrow A6 direction, and stops at a sheltering position (for example, the position of a dotted line "b"). By this operation, it becomes possible to separate the back panel 20 and the front panel 10 completely.

FIG. 7 is a view showing the state in which the back panel 20 and the front panel 10 are perfectly separated and the rotation movement body 41 is stopping at the sheltering position. By making the front panel 10 shelter from the back panel 20 at a sufficient angle, it becomes possible to prevent the interference of the back panel 20 with the front panel 10 when the back panel 20 performs its sub-scanning operation. A mechanism for performing a series of work for separating the back panel 20 and the front panel 10 in such a manner is given a general name of separation mechanism.

A reference numeral 502 in FIG. 6 designates a back panel attraction sensor. The back panel attraction sensor 502 is turned on when the back panel 20 is attracted by the magnet 58, and is turned off when the back panel 20 is separated from the magnet 58. When the back panel attraction sensor 502 outputs its OFF state in a time zone during which the back panel attraction sensor 502 should be in its ON state originally, the radiographic image reading apparatus regards the output signal as the indication of the peeling off of the back panel 20 from the magnet 58 or as the indication of the dropping of the back panel 20 from the magnet 58. And then, the radiographic image reading apparatus judges the situation to be an error.

When the back panel 20 has been perfectly separated from the front panel 10 by means of the separation mechanism, the not shown actuating section operates to convey (sub-scan) the back panel 20 into the arrow A4 direction (upward direction). During the sub-scanning operation, the storage phosphor sheet 28 is subjected to main scanning in the perpendicular direction to the sub-scanning direction with a laser beam B emitted from a laser scanning unit 61.

When the laser beam acts on the storage phosphor sheet 28, the photo-stimulable luminescence (image information) proportional to the radiation energy accumulated in the storage phosphor sheet 28 is released. The photo-stimulable luminescence is collected by a light collection mirror 64 and an end face of an optical guide 62 to be collected to a light collection tube 63 through the optical guide 62. It is preferable to use a light collection tube having a structure like one disclosed in, for example, the specification of Japanese Patent Application No. 2000-103904 as the light collection tube 63. A not shown photoelectric conversion element such as a photomultiplier or the like is arranged on an end face of the light collection tube 63. The photoelectric conversion element converts the collected photo-stimulable luminescence to an electric signal. The photo-stimulable luminescence converted to the electric signal is processed by predetermined signal processing as image data. After that, the processed electric signal is output from the apparatus body 2 to image output apparatus such as an operation terminal, an image storage apparatus, an image display apparatus, a dry imager and the like (any of them are not shown) through not shown communication cables. The image information read mechanism composed of the laser scanning unit 61, the optical guide 62, the light collection tube 63, the photoelectric conversion element and the like in such a manner is called as the read mechanism 60. It is needless to say that the read mechanism 60 may be achieved by configurations other than the embodiment as long as the configuration can be a read mechanism for reading image information from the storage phosphor sheet 28.

Hereupon, several kinds of control pertaining to reading operation will be described by means of FIG. 6. A reference numeral 503 designates a read starting sensor. When the sub-scanning movement plate 57 ascends, the sensor 503 is turned on from its OFF state. By utilizing the timing, the not shown control section calculates a read start time or a laser light start time.

A reference numeral 540 designates a pealing detection mechanism. By means of the pealing detection mechanism 540, it is detected whether the storage phosphor sheet 28 and the support plate 27 which are stuck to the back panel 20 are floating or begin to peel from the back panel 20 or not. In the case where the storage phosphor sheet 28 and the support plate 27 are floating or begin to peel from the back panel 20, it is apprehended that the storage phosphor sheet 28 and the support plate 27 interfere with the light collection mirror 64 and the end face of the optical guide 62 to destroy the light collection mirror 64 and the optical guide 62 or to damage the surface of the storage phosphor sheet 28. Accordingly, the floating or the pealing of the storage phosphor sheet 28 and the support plate 27 are detected by the pealing detection mechanism 540. Then, when the floating or the pealing of the storage phosphor sheet 28 and the support plate 27 are detected, the sub-scanning operation is stopped, and the sub-scanning movement plate 57 is made to descend to the uniting position with the front panel 10.

The pealing detection mechanism 540 is realized by, for example, the combination of a roller and a sensor. A peeling detection roller 541 having the length almost the same as that of the short size direction of the 14×17 inch size is held in the horizontal direction. A presser bar 542 used for fixing the axis of the peeling detection roller 541 is extended to the front surface side of the apparatus through supporting shaft 544, and a peeling detection 543 is disposed on the rear end of the presser bar 542. When the storage phosphor sheet 28 or the support plate 27 contacts with the peeling detection roller 541 on ascending, the presser bar 542 inclines around the supporting shaft 544 as a fulcrum. Then, the peeling detection sensor 543 detects the inclination to inform a peeling detection signal to the not shown control section.

When the reading of image information from the storage phosphor sheet 28 is completed, the not shown actuating section begins to convey the back panel 20 into an arrow A5 direction (lower direction). During the back panel 20 is being conveyed into the arrow A5 direction, an erasing mechanism 65 emits erasing light C to erase the image information remaining in the storage phosphor sheet 28. A halogen lamp, a high intensity fluorescent tube, an LED array and the like can be used as an erasing lamp to be used in the erasing mechanism 65.

In this embodiment, n (n>1) erasing lamps are prepared. Moreover, a not shown lamp burning detection member watches whether lump burning of the erasing lamp has occurred or not. When the lamp burning detection member detects m (m<n) erasing lamps among the n erasing lamps has generated the lamp burning, the erasing speed is controlled to be almost (n−m)/n of the erasing speed in time of no lamp burning resides, and the erasing is controlled to be performed at the same light quantity as that in time of no lamp burning resides. By such control, even when lamp burning occurred, it is prevented that the apparatus cannot be used, and reading work and erasing work can be continued in the state of the lamp burning.

Moreover, because there is no chance of performing erasing in the state in which the erasing light quantity has decreased owing to the lamp burning, there is no risks of damaging diagnosis information by executing the next photographing in the state of insufficient erasing so that the remainder of the erasing of the previous image works as noises to the next image information.

Moreover, when the lamp burning detection member detects all of the n erasing lamps has burned, the error display informing the occurrence of the lamp burning of all of the erasing lamps is displayed on the display 81, and both of the read operation and the erasing operation are controlled not to be performed after that. By the control in such a way, the read work and the erasing work in the state in which erasing cannot be performed are prohibited, and the accident of performing radiation photographing by the use of a cassette 1 the erasing of which has not been performed is prevented.

This embodiment is configured so that, when the reading mode is selected, the reading of image information is performed on an outward journey of the sub-scanning mechanism 50 (conveyance to the upper direction), and that the erasing of remaining image information is performed on a return journey of the sub-scanning mechanism 50 (conveyance to the lower direction). Consequently, this embodiment can effectively utilize the time necessary for the reciprocating motion of the sub-scanning mechanism 50 without consumes the time in vain. Thereby, the processing ability (throughput) of the radiographic image reading apparatus can be improved.

Moreover, when the erase mode is selected, erasing is performed on an outward journey of the sub-scanning mechanism 50 (conveyance to the upper direction), and erasing is also performed on a return journey of the sub-scanning mechanism 50 (conveyance to the lower direction). The cycle time in the erase mode can be improved in comparison with the cycle time in the reading mode.

Moreover, when the erase mode is selected, erasing may not be performed on an outward journey of the sub-scanning mechanism 50 (conveyance to the upper direction), and erasing may performed only on a return journey of the sub-scanning mechanism 50 (conveyance to the lower direction). In this case, the improvement of the cycle time in the erase mode cannot be expected, but it is possible to perform the control of the erase mode equally the control of the reading mode, and thereby the control can be simplified.

Moreover, in this embodiment, the erasing mechanism 65 is arranged at the lowest step of the read mechanism 60 in the vertical direction. Consequently, when the read work of image information by means of the read mechanism 60 is terminated, it is possible to switch the moving direction of the sub-scanning mechanism 50 to the return journey direction (the lower direction) immediately after the termination. Thereby, because erasing work can be started during the reciprocating motion of the sub-scanning mechanism 50 without any loss of time, the processing ability (throughput) of the radiographic image reading apparatus can be further improved.

Moreover, because the arrangement of the erasing mechanism 65 to the lowest step of the read mechanism 60 in the vertical direction removes the chance of passing of the lower end of the back panel 20 at the read position B in the read mechanism 60, accidents of interference of the lower end of the back panel 20 with a collecting mechanism such as the optical guide 62 or the like to make the descending of the back panel 20 impossible can be previously prevented. Consequently, the reliability and the stability of the apparatus can be improved.

At the point of time when the back panel 20 has descended, the origin position of the sub-scanning direction is confirmed by means of a sub-scanning origin sensor 501, and then the back panel 20 ascends to the position at which the back panel 20 is delivered to the magnet 58 with the origin position as the reference to stop the movement of the back panel 20.

When the back panel 20 stops at the position where the back panel 20 is delivered to the magnet 58, the rotation movement body 41 which has been sheltering at the sheltering position again rotates to move to the position of the dotted line "c" to make the back panel 20 and the front panel 10 unite with each other. When the back panel 20 and the front panel 10 unite with each other, the lock pin 440, which has been hosed in the lock opening and closing mechanism 44, ascends, and the tip of the lock pin 440 is inserted into the insertion opening 14 of the front panel 10. By the operation, the cassette 1, which has been in the lock OFF state, is locked, and shifts to the lock ON state. That is, the back panel 20 and the front panel 10 are in the state of being impossible to be separated from each other. When the cassette 1 shifts to the lock ON state, the lock pin 440 descends to be housed in the lock opening and closing mechanism 44 again. The mechanism for performing the series of work for shifting the locked state of the cassette 1 from the lock OFF state to the lock ON state in such a manner is generally called as a uniting mechanism.

When the uniting work of the back panel 20 and the front panel 10 has been completed by the uniting mechanism, the rotation movement body 41 again rotate to move to the position of the dotted line "b" into the arrow A6 direction to stop there. Because the operation of peeling the back panel 20 (cassette 1) from the magnet 58 is performed together with the rotation movement, the back panel 20 (cassette 1) can be peeled from the magnet 58 with smaller force in comparison with the force in case of peeling the back panel 20 from the magnet 58 in a parallel movement. When the rotation movement body 41 stops at the position of the dotted line "b", the width shifting members 42a and 42b move from the holding positions S2 shown in FIGS. 10A and 10B into arrow M2 directions, and stops at the sheltering positions S1. Thereby, the holding state of the front panel 10 is released, and the cassette 1 takes the state of capable of ascending on the rotation movement body 41.

When the holding state of the front panel 10 is released, the elevating platform 43 conveys the cassette 1 along the rotation movement body 41 into the direction of the ejection opening 4, and to deliver the cassette 1 to ejection rollers 73a, 73b. When the ejection rollers 73a, 73b receive the cassette 1, the ejection roller 73a, 73b perform ejection operation of the cassette 1 until the cassette 1 has been completely ejected to the ejection opening 4. When the cassette 1 has been completely ejected to the ejection opening 4, the rotation movement body 41 rotation to move to the position of the dotted line "a" into the arrow A6 direction and stops there. Then, the rotation movement body 41 there shifts to the state capable of receiving the next cassette 1.

This embodiment is provided with a stacker section in which about 2 to 5 cassettes 1 can be stacked at the ejection opening 4. If the position of the cassette 1 immediately after the completion of the ejection to the ejection opening 4 is designated by a reference numeral 1a in FIG. 6, the cassette 1 ejected to the position 1a flops into an arrow A8 direction from the upper end of the cassette 1 owing to the own weight of the cassette 1, and finally moves to the position designated by a reference numeral 1b. In order that the operation should be performed only by the own weight of the cassette 1, a base plate section 71c of the ejection opening 4 is previously inclined from the position 1a side to the position 1b side. The base plate section 71c is formed of resin parts, and the surface of the base plate section 71c includes a rib form for decreasing the frictional resistance with the cassette 1. Moreover, Teflon coating is formed lest the rib form should be scraped owing to the friction with the cassette 1 to decrease the sliding performance.

Moreover, for conveying the cassette 1 surely from the position 1a side to the position 1b side, the radiographic image reading apparatus is configured to provide, for example, an ejection cassette conveyance mechanism for conveying the lower part of the cassette 1 into the arrow A8 direction for moving the whole cassette 1 surely from the position 1a to the position 1b. The ejection cassette conveyance mechanism can be realized by adopting a belt conveyance system, a roller conveyance system, or the like. Moreover, the mechanism in which the cassette 1 is pushed out from the position 1a side to the position 1b side by a not shown mechanism maybe adopted. As long as the cassette 1 ejected from the ejection opening 4 is basically considered not to obturate the exit of the ejection rollers 73a, 73b, the cassette 1 ejected from the ejection rollers 73a, 73b may take any form or any positional relation in the stacker section of the ejection opening 4.

Because the ejection opening 4 is configured to be able to stack about 2 to 5 ejection cassettes 1 (hereinafter, the cassette 1 ejected from the ejection opening 4 will be suitably called as ejection cassette 1), a user can insert the cassettes 1 which have been used for photographing into the insertion opening 3 in order until the ejection opening 4 is filled with the ejection cassettes 1 without withdrawing the ejection cassettes 1. Generally a test using radiation photographing uses one to five cassettes 1, averaging about 1.8 cassettes 1 per test. Consequently, if the ejection opening 4 is configured to be able to stack about two to five ejection cassettes 1, it becomes rare that the user is troubled by the withdrawal of the ejection cassettes 1 during a test, and then the work can be effectively performed.

When the next cassette 1 is ejected in the case where the stacker section of the ejection opening 4 is filled with the ejection cassettes 1, defects such that the ejection cassettes 1 stacked in the ejection opening 4 already fall by being pushed out by the newly ejected cassette 1, or such that the cassette 1 is tried to be compulsorily ejected to cause a breakdown, are generated. Accordingly, a not shown sensor or a mechanism is provided for detecting whether the stacker section of the ejection opening 4 is filled with the ejection cassettes 1 or not, and thereby whether the stacker section of the ejection opening 4 is filled with the ejection cassettes 1 or not is detected.

In this embodiment, whether the stacker section is filled with the ejection cassettes 1 or not is detected by means of an ejection shutter 75 which is located at the upper part of ejection rollers 73a and 73b and is used for shielding the leaking light from a gap between the ejection rollers 73a and 73b. That is, the radiographic image reading apparatus is also provided with a ejection shutter opening and closing detection mechanism (not shown) which judges that the stacker section is not filled when the ejection shutter 75 is closed after the ejection of a cassette 1, and judges that the stacker section is filled when the ejection shutter 75 is not closed after the ejection of a cassette 1. Then, the not shown control section detects the filled state of the stacker section on the basis of a detection signal from the ejection shutter opening and closing detection mechanisms. For performing the control, the radiographic image reading apparatus is configured not to close the ejection shutter 75 lastingly when a cassette 1 by which the stacker section is filled is ejected. As described above, because it is detected only by the opening and closing of the ejection shutter 75 whether the stacker section is filled or not, the apparatus can be constructed to be in a simple structure.

It is preferable that, when the stacker section of the ejection opening 4 is filled with the ejection cassettes 1, the defect is evaded by means of the following mechanisms.

1) A mechanism for preventing the insertion of the cassette 1 into the insertion opening 3.

2) A mechanism for preventing to take in the cassette 1 into the inner part of the apparatus body 2 while allowing the insertion of the cassette 1 into the insertion opening 3.

3) A mechanism for stopping the cassette 1 before the reading of image information while allowing to take the cassette 1 inserted into the insertion opening 3 into the inner part of the apparatus body 2.

4) A mechanism for stopping the cassette 1 before the ejection to the ejection opening 4 after taking the cassette 1 inserted into the insertion opening 3 into the inner part of the apparatus body 2 to read image information of the cassette 1.

Moreover, it is preferable to inform a user of the state of the stacker section of the ejection opening 4 which is filled with the ejection cassettes 1 by means of the following mechanisms in addition to the adoption of the above-mentioned mechanisms.

1) A mechanism for informing the user of the state by displaying a warning error message on the display 81, by turning on and off an ejection indicator 77, or by sounding a warning beep.

2) A mechanism for informing the user of the state by displaying a message on the monitor of the not shown operation terminal connected to the display 80 or to the apparatus body 2.

3) A mechanism for informing the user of the state by providing a lid (not shown) to the insertion opening 3 to make it impossible to insert the cassette 1 by closing the lid.

It is preferable that, when the stacker section of the ejection opening 4 becomes in the state in which the stacker section is not filled by the removal of a part of or all of the ejection cassettes 1 by the user, the processing of the cassettes 1 stopping in the inner part of the apparatus body 2 or at the insertion opening 3 is automatically resumed.

Moreover, it is considerable that the following operation cannot be continued owing to the generation of any defect from one cause or another during the operation of taking the cassette 1 into the apparatus body 2, during the conveyance operation after the taking of the cassette 1 into the apparatus body 2, during the reading operation, during the operation of ejecting the cassette 1 from the apparatus body 2, or the like. For example, a defect is produced in the conveyance mechanism 40 during the conveyance operation of the cassette 1 to make it impossible to continue the conveyance operation; the back panel 20 and the front panel 10 fall at the delivery of the back panel 20 to the sub-scanning mechanism 50; the front panel 10 and the back panel 20 cannot be separated; the front panel 10 and the back panel 20 cannot unite with each other; and the like. As described above, various defects can be produced.

When such defects are produced, it is preferable to inform the user of the production of the defects by means of the similar mechanisms to that of informing the user of the filling of the stacker section of the ejection opening 4 with the ejection cassettes 1.

Moreover, when an error is produced in the state capable of ejecting the cassette 1 after the conveyance of the cassette 1 to the inner part of the apparatus body 2, it is preferable not to eject the cassette 1 to the insertion opening 3, but to eject the cassette 1 to the ejection opening 4. The reason is that the user may be trying to insert the next cassette 1 into the insertion opening 3 after the cassette 1 have been conveyed to the inner part of the apparatus body 2.

Moreover, the radiographic image reading apparatus may be configured to examine whether the next cassette 1 has been inserted into the insertion opening 3 or not with a not shown cassette detection sensor, and to eject the cassette 1 into the insertion opening 3 when the cassette 1 is not detected in the insertion opening 3.

Moreover, the radiographic image reading apparatus also may be configured to change the destination of the ejection of the cassette 1 according to the progress of the processing, for example, to eject the cassette 1 to the insertion opening 3 when an error has been produced before the read of image information, to eject the cassette 1 to the ejection opening 4 when an error has been produced during or after the reading of image information, or the like. Moreover, the radiographic image reading apparatus may be configured not to eject the cassette 1, but to stay the cassette 1 in the inner part of the apparatus and to stop the operation of the apparatus.

Moreover, when an error is produced, it is preferable to display the information for specifying the cassette 1 in which the error has been produced, for example, the identification number (ID number) or the like of the storage phosphor sheet 28 which is stored in the code storage element 200 together with an error message on the display 81, the monitor of the not shown operation terminal connected to the apparatus body 2 to make it possible that the user can distinguish the cassette 1 in which the error has been produced.

In particular, when the cassette 1 in which an error has been produced is ejected to the insertion opening 3 or the ejection opening 4, it is preferable to inform the user of the information for specifying the cassette 1 in which the error has been produced or an error message indicating the contents of the error.

Moreover, in the case where the cassette 1 is not ejected but is stopped in the inner part of the apparatus and the operation of the apparatus is stopped when an error has been produced, if which position in the inner part of the apparatus the cassette 1 (the back panel 20, the front panel 10 or the like) is staying at is diagrammatically displayed by means of a cartoon on the display 81, the not shown operation terminal or the lie, or if an instruction message pertaining to what an operation procedure makes it possible to take out the cassette 1 (the back panel 20, the front panel 10 or the like) which is staying at the inner part of the apparatus is displayed, then the cassette 1 (the back panel 20, the front panel 10 or the like) staying at the inner part of the apparatus can be taken out for a short time.

Moreover, when an error is produced in the state in which the cassette 1 cannot be ejected to the outside, or when the cassette 1 is controlled to be stopped in the inner part of the apparatus when an error is produced, the operation of the apparatus is stopped, and the occurrence of the error is informed to the user in the state in which the cassette 1 is left in the inner part of the apparatus. In this time, it is preferable that the staying of the cassette 1 in the inner part of the apparatus and the necessity of the removal of the cassette 1 are informed together with an error message. In this time, it is preferable to display an action which the user should take to the error as an message together with the error information.

As errors which can be produced other than the errors pertaining to the cassette 1 and the apparatus mechanism, an electrical error, an error related to software, a communication error, an optical error and the like can be considered. Even when these errors are produced, it is preferable to inform the user of the contents of the errors as an error message.

In case of the apparatus to be used in a medical spot, when the apparatus has stopped owing to a defect, it is preferable not only to inform the user of the occurrence of the defect, but also to eliminate the defect immediately, and to restore the apparatus to be able to be used again.

However, such the restoring work of the defect of the prior art radiographic image reading apparatus using a storage phosphor has been limited to the work of a service man. Consequently, when a defect is produced, the user is obliged to call a service man and to stop the radiation photographing service until the service man arrives.

In a copy machine, a printer or the like, it has become common knowledge to install a user maintenance mechanism for enabling a user to release a jam when output paper causes the jam. As the reasons why such a user maintenance mechanism has not been realized in the radiographic image reading apparatus using a storage phosphor, the following causes can be considered.

1) In case of the copy machine or a printer, because output paper are very cheap, the presupposition that the output paper which has caused a jam maybe spoilt (maybe output again) can be concluded. However, in case of the radiographic image reading apparatus using a storage phosphor, a storage phosphor sheet is very expensive. Consequently, the presupposition that the storage phosphor sheet may be spoilt is not concluded. Because of such a restriction, the construction of the mechanism of the user maintenance is difficult.

2) In a copy machine or a printer, even when the output paper which has caused a jam is spoilt, a copy or a print out can be performed again. On the contrary, the storage phosphor sheet used for a radiographic image reading apparatus stores image information of a patient. When the storage phosphor sheet is spoilt, it is necessary to perform re-photographing of the patient. However, the re-photographing makes the patient be exposed by superfluous radiation, which is very undesirable.

Accordingly, in this embodiment, the user maintenance mechanism of a radiographic image reading apparatus, mainly a cassette jam releasing mechanism, is realized in the following configuration.

As shown in FIG. 6, the apparatus body 2 is provided with the maintenance door 5. By opening the maintenance door 5, the user can access the inner part of the apparatus body 2. Moreover, the rotation movement body 41 can be rotated to move to the position of a dotted line "d" with a hand operation. Thereby, the user can access a part more inside (on the sub-scanning mechanism 50 side) than the position of the rotation movement body 41. The mechanism will be described by means of FIGS. 6 and 7. The user opens a maintenance door lock 510 with a manual operation, and makes the maintenance door 5 an open state. When the maintenance door 5 is in its close state, an interlock killer 530 fixed on the maintenance door 5 acts on an interlock switch 96 fixed to the apparatus body 2, and then the apparatus body 2 is in the state in which the apparatus body 2 can operate. However, when the maintenance door 5 becomes its open state, the interlock killer 530 comes out from the interlock switch 96, and the interlock works to intercept the power source supply mainly to a mechanism actuating system of the motor, the sensors and the like, a laser actuating system, a high voltage power source system to the photomultiplier tube.

In the inside of the maintenance door 5, a rotation knob 49 is housed in a housing box 521. The user takes out the rotation knob 49 from the housing box 521 to fit fitting holes 493 of a disk 492 of the rotation knob 49 to projections 463 of a cylinder member 462 fixed to a motor shaft 461 of the conveyance motor unit 46.

Next, when a rotation handle 490 of the rotation knob 49 is pinched and the rotation knob 47 is rotated clockwise, the pinion gear 47 rotates on the rack teeth 480 on the rugged form formed on the circular arc of the rotation support plate 48. Then, the rotation movement body 41 rotates to move into the direction of the dotted line "d". When the rotation movement body 41 has rotated to move to the position of the dotted line "d", a space through which accessing to the inner part of the apparatus body 2 can be done is generated. Then, the user can take out the cassette 1 staying in the inner part of the apparatus body 2.

There are many cassettes 1 staying in the inner part of the apparatus body 2 in the form in which the front panels 10 and the back panels 20 unite with each other on the elevating platforms 43 chiefly. In this case, it is possible to taken out the cassettes 1 along the rotation movement body 41 immediately. In this case, because the storage phosphor sheets 28 are protected in the inner part of the cassettes 1, it is possible that a cassette jam can be released without damaging the storage phosphor sheets 28.

As another case, there is a case where the back panel 20 resides on the magnet 58 and the front panel 10 resides on the rotation movement body 41. In this case, after the back panel 20 has been peeled from the magnet 58 and has been superposed on the front panel 10 on the rotation movement body 41 at a normal position, both of the front panel 10 and the back panel 20 can be drawn out along the rotation movement body 41. Because the back panel 20 is attracted to the magnet 58 only by the magnetic force, the back panel 20 can be easily peeled from the magnet 58 without performing superfluous operation. Moreover, because the apparatus is configured to be able to move up and down the sub-scanning movement plate 57 of the sub-scanning mechanism 50 with manual operations, the sub-scanning movement plate 57 can be manually operated to a position where the back panel 20 can be easily peeled from the magnet 58. This case is characterized by the capability of keeping the state in which any mechanisms do not contact with the surface of the storage phosphor sheet 28 on the back panel 20. Consequently, cassette jams can be released without injuring the surface of the storage phosphor sheet 28.

As the other case, there is the case where the front panel 10 is ejected to the election opening 4 and only the back panel 10 is remaining on the magnet 58. In this case, the back panel 20 is peeled from the magnet 58, and the peeled back panel 20 is taken out to the outside of the apparatus carefully. This case is also characterized by the capability of keeping the state in which no mechanisms contact wit the surface of the storage phosphor sheet 28 on the back panel 20. Cassette jams can be released without injuring the surface of the storage phosphor sheet 28.

Moreover, even when the cassette 1, the front panel 10 or the back panel 20 falls in the inner part of the apparatus body 2, the fallen cassette 1, the front panel 10 or the back panel 20 can be pick out by rotating and moving the rotation movement body 41 into the direction of the dotted line "d".

Because the positions of the elevating platform 43 and the width shifting member 42 can be changed with manual operations, the elevating platform 43 can be manually moved into the arrow A2 direction (downward), or the width shifting members 42a and 42b can be moved into the arrow M2 directions shown in FIGS. 10A and 10B when the upper section of the cassette 1 interferes with the insertion rollers 72a and 72b, the ejection rollers 73a and 73b, or the mechanism in the inner part of the apparatus to make it impossible that the rotation movement body 41 rotates to mover into the direction of the dotted line "d". Consequently, the user can take out the cassette 1 in which a defect has been caused to the outside of the apparatus without using specific jig.

Moreover, a feature of the apparatus is that the apparatus mechanism has no sections in which the cassette 1, the front panel 10 or the back panel 20 is gripped or is held with strong force to the degree of making it impossible to take out one of them with manual operations. Although the insertion rollers 72a and 72b and the ejection rollers 73a and 73b grip the cassette 1, the cassette 1 can be easily taken out because the insertion rollers 72a and 72b and the ejection rollers 73a and 73b rotate in a free state. Moreover, even in the state in which the cassette 1 is held by the width shifting members 42a and 42b in the inner part of the apparatus body 2, the cassette 1 can be easily taken out because there are no parts where the width shifting members 42a and 42b and the cassette 1 are fitted to each other (because the cassette 1 is in the state in which the width shifting members 42a and 42b are only pressing from both sides of the cassette 1). Moreover, because the width shifting members 42a and 42b can be manually moved into the arrow M2 directions shown in FIGS. 10A and 10B, the cassette 1 can be taken out after being made to be in a free state on the elevating platform 43.

Moreover, when the cassette 1 is made to stay to be stopping in the inner part of the apparatus body 2 at the occurrence of an error, the apparatus is stopped after the rotation movement body 41 has been moved to the position of the dotted line "a" and the width shifting members 42a and 42b are moved to the positions of the waiting positions S1. Then, the display 81 performs error display. Thereby, the time necessary for user's taking out the cassette 1 can be minimized.

Moreover, also when the back panel 20 resides on the magnet 58, by making the sub-scanning movement plate 57 descend to the delivery position to the front panel 10 to stop the apparatus, the time necessary for a user to take out the cassette 1 can be minimized.

Moreover, when the radiographic image reading apparatus is configured so that the position of the cassette insertion and ejection section 70 can be easily changed with manual operations (for example, the apparatus is configured so that the position of the cassette insertion and ejection section 70 can be manually slid or rotated to move into the upper direction, or configured so that the position of the cassette insertion and ejection section 70 can be manually rotated to move in the horizontal direction like a maintenance door, or configured so that the cassette insertion and ejection section 70 can easily removed with manual operations), the accessing space to the inner part of the apparatus is widened, and the maintenance work becomes easy to perform.

One of the important errors which can be caused in this embodiment is an error of leaving the back panel 20 in the inner part of the apparatus body 2 and of ejecting only the front panel 10 (falling error of the back panel 20). This error is an defect produced by dropping the back panel 20 erroneously at the uniting work of the front panel 10 and the back panel 20. Because there is no measure for confirming the result of uniting after the uniting work of the front panel 10 with the back panel 20 even if the defect has been produced, only the front panel 10 is ejected with the back panel 20 being left in the inner part of the apparatus body 2. After that, when the next cassette 1 has been taken in the inner part of the apparatus and a series of operation has begun, not only the back panel 20 dropped in the inner part of the apparatus is broken, but also the apparatus mechanism is damaged. Accordingly, this embodiment settled the problem by the following measure.

First, as shown in FIG. 7, the ejection roller 73b is formed to be a dumpling roller so as to form a space at the center section of the ejection roller 73b, and a back panel falling detection mechanism is formed in the space. The back panel falling detection mechanism is composed of a back panel tracing rod 73b1 and a back panel falling detection sensor 73b2. In the state in which the cassette 1 does not pass the ejection roller 73b, the back panel falling detection sensor 73b2 outputs an ON signal. When the front panel 10 passes the ejection roller 73b with the back panel 20, the tip of the back panel tracing rod 73b1 on the ejection opening 4 side inclines to the upper side, and the back panel falling detection sensor 73b2 outputs an OFF signal When the cassette 1 has passed the ejection roller 73b, the back panel falling detection sensor 73b2 again outputs the ON signal. That is, when the front panel 10 passes the ejection roller 73b with the back panel 20, the back panel falling detection sensor 73b2 continues to output the OFF signal always during the front panel 10 is passing.

However, when the front panel 10 has passed the ejection roller 73b without the back panel 20, the tip of the back panel tracing rod 73b1 on the ejection opening 4 side once inclines to the upper side when the frame 11 part of the front panel 10 passes there. At this time, the back panel falling detection sensor 73b2 outputs the OFF signal. However, because the back panel 20 does not exist after that, the back panel falling detection sensor 73b2 again outputs the ON signal. That is, the back panel falling detection sensor 73b2 always continues to output the ON signal during the front panel 10 passes except for a short time when the frame 11 part of the front panel 10 passes. By catching the ON signal, the not shown control section can recognize that the back panel 20 is left in the inner part of the apparatus body 2, and the control section can control the apparatus not to operate even when the next cassette 1 is inserted.

The conveyance mechanism 40 in the embodiment shown in FIG. 6 includes at least two kinds of conveyance mechanism of a linear conveyance mechanism (a mechanism for linearly conveying the cassette 1 into up and down directions along the rotation movement body 41 of the conveyance mechanism 40) by the elevating platform 43, and a rotation conveyance mechanism for rotating and moving the cassette 1 around the rotation shaft 45 as the rotation center.

FIG. 6 shows an example realizing the two conveyance mechanisms of the linear conveyance mechanism and the rotation conveyance mechanism on the rotation movement body 41. However, for example, the two conveyance mechanisms of the linear conveyance mechanism and the rotation conveyance mechanism may be realized by individual mechanisms. For example, the radiographic image reading apparatus may be configured so that the rotation conveyance mechanism rotates to move independent of the linear conveyance mechanism.

Moreover, the rotation conveyance mechanism may be configured so that a part of the conveyance mechanism 40 (rotation movement body 41) rotates to move.

Moreover, the rotation conveyance mechanism may be configure by being divided into a plurality of rotation conveyance mechanisms.

Similarly, a linear conveyance mechanism may be configured by being divided into a plurality of linear conveyance mechanisms.

Moreover, the embodiment shown in FIG. 6 is configured to separate the front panel 10 and the back panel 20 after the back panel back surface 210 of the back panel 20 has been attracted to the magnet 58. However, the embodiment may be configured to make the back panel back surface 210 of the back panel 20 be attracted to the magnet 58 after the front panel 10 and the back panel 20 have been separated from each other.

Moreover, the embodiment of FIG. 6 is configured to separate the front panel 10 and the back panel 20 from each other after rotating and moving the cassette 1. However, the embodiment may be configured to rotate to mover only the back panel 20 after separating the front panel 10 and the back panel 20 from each other.

Moreover, the embodiment of FIG. 6 is configured to deliver the back panel 20 to the sub-scanning mechanism 50 by means of the rotation and movement of the rotation movement body 41. However, the embodiment may be configured to deliver the back panel 20 to the sub-scanning mechanism 50 by the rotation and the movement of a part or the whole of the sub-scanning movement plate 57.

Moreover, in the embodiment of FIG. 6, the conveyance mechanism 40 and the sub-scanning function 50 are constructed on the same substrate 92, and the substrate 92 is fixed to the base plate 91 with the rubber vibration isolator 93 between them. However, the embodiment may be configured so that the convey mechanism 40 and the sub-scanning function 50 are constructed on different substrates and the respective substrates are fixed to the base plate 91 with the rubber vibration isolator 93 put between them, or that the conveyance mechanism 40 is directly constructed on the base plate 91. Thereby, it can be prevented that vibrations generated by the operation of the conveyance mechanism 40 are propagated to the sub-scanning mechanism 50.

Moreover, the embodiment of FIG. 6 may be configured so that the back panel 20 is absorbed to the sub-scanning movement plate 57 equipped with an absorption member such as vacuum. In this case, the back surface of the back panel back surface 210 is unnecessary to be a magnetic substance, an the magnet 58 on the sub-scanning movement plate 57 is also unnecessary.

Moreover, the embodiment of FIG. 6 may be configured so that only one of the insertion opening 3 and the ejection opening 4 of the cassette insertion and ejection section 70 can be demounted from a conveyance read section 2a, or that the position can be changed with manual operations. Moreover, the embodiment may be configured so that the insertion opening 3 and the ejection opening 4 of the cassette insertion and ejection section 70 can be individually removed, or the positions can be individually changed with manual operations.

The entire disclosure of Japanese Patent Application No. Tokugan 2002-237700 filed on Aug. 16, 2002 including specification, claims drawings and summary are incorporated herein by reference in its entirety.

What is claimed is:

1. A radiographic image reading apparatus for reading image information stored in a storage phosphor sheet from a cassette in which the storage phosphor sheet is incorporated and on which code information is recorded at a predetermined position, comprising:

an insertion opening into which the cassette is inserted along to an end side of a width direction of the insertion opening;

a code information read mechanism for reading the code information of the inserted cassette positioned along the end side of the width direction of the insertion opening;

a width shifting mechanism for shifting the cassette in which the code information is read by the code information read mechanism, to a center of a width direction of a conveyance mechanism for conveying the cassette;

a separation mechanism for separating a front panel of the cassette from a back panel of the cassette in which the storage phosphor sheet is incorporated, after the cassette is shifted by the width shifting mechanism in order to read the image information stored in the storage phosphor sheet; and an image information read mechanism for reading the image information stored in the storage phosphor sheet of the back panel separated by the separation mechanism so as to read the image information;

wherein the image information read mechanism reads the image information while the storage phosphor sheet is sub-scanned on a center reference.

2. A radiographic image reading apparatus for reading image information stored in a storage phosphor sheet from a cassette in which the storage phosphor sheet is incorporated and on which code information is recorded at a predetermined position, comprising:

an insertion opening into which the cassette is inserted along to an end side of a width direction of the insertion opening;

a code information read mechanism for reading the code information of the inserted cassette positioned along the end side of the width direction of the insertion opening;

a width shifting mechanism for shifting the cassette in which the code information is read by the code information read mechanism, to a center of a width direction of a conveyance mechanism for conveying the cassette;

a separation mechanism for separating a front panel of the cassette from a back panel of the cassette in which the storage phosphor sheet is incorporated, after the cassette is shifted by the width shifting mechanism in order to read the image information stored in the storage phosphor sheet;

an image information read mechanism for reading the image information stored in the storage phosphor sheet of the back panel separated by the separation mechanism so as to read the image information;

an erase mechanism for erasing image information remaining in the storage phosphor sheet after the image information of the storage phosphor sheet is read by the image information read mechanism;

a uniting mechanism for uniting the back panel with the front panel after the image information remained in the storage phosphor sheet on the back panel is erased by the erase mechanism;

an ejection mechanism for conveying the cassette with the storage phosphor sheet is united by the uniting mechanism, on a center reference to eject the cassette;

at least two modes of a read mode for reading the image information stored in the storage phosphor sheet with the image information read mechanism, and an erase mode for erasing the image information stored in the storage phosphor sheet with the erase mechanism; and a switching mechanism for switching the two modes.

3. The radiographic image reading apparatus of claim 2, wherein the read mode performs at least two operations of a read operation for reading the image information from the storage phosphor sheet with the image information read mechanism, and an erase operation for erasing image information remaining in the storage phosphor sheet after the read operation is carried by the erase mechanism.

4. The radiographic image reading apparatus of claim 2, wherein the erase mode performs the erase operation without performing the read operation for reading the image information with the image information read mechanism.

5. The radiographic image reading apparatus of claim 2, wherein the read mode is automatically selected at starting of the radiographic image reading apparatus, and the erase mode and the read mode are alternately selected by operating the switching mechanism.

6. The radiographic image reading apparatus of claim 4, wherein, in a case that the erase mode is selected, when the cassette is supplied to the radiographic image reading apparatus within a predetermined time, the erase operation is executed; and when the cassette is not supplied to the radiographic image reading apparatus within the predetermined time, the erase mode is automatically finished and the radiographic image reading apparatus returns to the read mode.

7. The radiographic image reading apparatus of claim 4, wherein in the erase mode, when the cassette is supplied to the radiographic image reading apparatus within a predetermined time after the erase operation is finished, the erase mode is continuously carried out, and when the cassette is not supplied to the radiographic image reading apparatus within the predetermined time, the erase mode is automatically finished and the radiographic image reading apparatus returns to the read mode.

8. The radiographic image reading apparatus of claim 6, further comprising a display for displaying the predetermined time.

9. The radiographic image reading apparatus of claim 8, wherein a residual time of the predetermined time displayed on the display is displayed by count down.

10. The radiographic image reading apparatus of claim 2, wherein the erase mode includes a plurality of erase operations in which erase speeds are different from each other, and the plurality of erase operations are selected by operating the switching mechanism.

11. The radiographic image reading apparatus of claim 2, wherein an operation of switching from the read mode to the erase mode requires a long pressing operation of a button or a switch of the switching mechanism.

* * * * *